(12) United States Patent
Sasaki et al.

(10) Patent No.: US 7,230,366 B2
(45) Date of Patent: Jun. 12, 2007

(54) VIBRATION WAVE LINEAR MOTOR

(75) Inventors: Yasuo Sasaki, Tokyo (JP); Heiji Ogino, Tokyo (JP); Toshihiro Nakao, Tokyo (JP)

(73) Assignee: Olympus Corporation, Tokyo (JP)

( * ) Notice: Subject to any disclaimer, the term of this patent is extended or adjusted under 35 U.S.C. 154(b) by 366 days.

(21) Appl. No.: 10/952,407

(22) Filed: Sep. 28, 2004

(65) Prior Publication Data
US 2005/0073217 A1 Apr. 7, 2005

(30) Foreign Application Priority Data
Oct. 1, 2003 (JP) .............................. 2003-342865

(51) Int. Cl.
*H01L 41/09* (2006.01)
*H02N 2/04* (2006.01)
(52) U.S. Cl. .................................. 310/323.17; 310/328
(58) Field of Classification Search ... 310/311–323.21, 310/328, 36, 81, 12, 15, 17, 20, 345; 396/75, 396/85, 113
See application file for complete search history.

(56) References Cited

U.S. PATENT DOCUMENTS

| | | | |
|---|---|---|---|
| 5,136,200 A * | 8/1992 | Takizawa et al. ...... | 310/323.16 |
| 5,644,440 A | 7/1997 | Akada | |
| 5,812,330 A | 9/1998 | Akada | |
| 7,129,620 B2 * | 10/2006 | Sakano et al. ......... | 310/323.09 |
| 7,129,621 B2 * | 10/2006 | Sakano et al. ......... | 310/323.09 |
| 7,157,832 B2 * | 1/2007 | Sasaki et al. .......... | 310/323.17 |
| 2005/0067922 A1 * | 3/2005 | Sasaki et al. .......... | 310/323.09 |
| 2005/0236931 A1 * | 10/2005 | Sakano et al. ......... | 310/323.17 |
| 2006/0043824 A1 * | 3/2006 | Sakano et al. ......... | 310/323.09 |
| 2006/0049719 A1 * | 3/2006 | Sakano et al. .............. | 310/328 |

FOREIGN PATENT DOCUMENTS

| | | |
|---|---|---|
| JP | 4-69072 | 3/1992 |
| JP | 7-163162 | 6/1995 |
| JP | 8-179184 | 7/1996 |
| JP | 9-149664 | 6/1997 |

* cited by examiner

*Primary Examiner*—Darren Schuberg
*Assistant Examiner*—David W. Scheuermann
(74) *Attorney, Agent, or Firm*—Scully, Scott, Murphy & Presser, P.C.

(57) ABSTRACT

In a vibration wave linear motor, a vibrator stably operates with a simple and small configuration. Both ends of a movable guide member are held by shaft bearing long holes to freely oscillate, and an angle of an inclination φ occurs according to the move of the vibrator. An inner wall of an erecting part of a supporting part also serves as a stopper, and regulates the move of the vibrator in a position where the inclination of the movable guide member becomes θ>φ at the maximum. As a result, the inclination of the movable guide member is always kept to be within the range of θ>φ. A problem that the inclining movable guide member contacts a portion other than a driving contacting part is prevented.

21 Claims, 21 Drawing Sheets

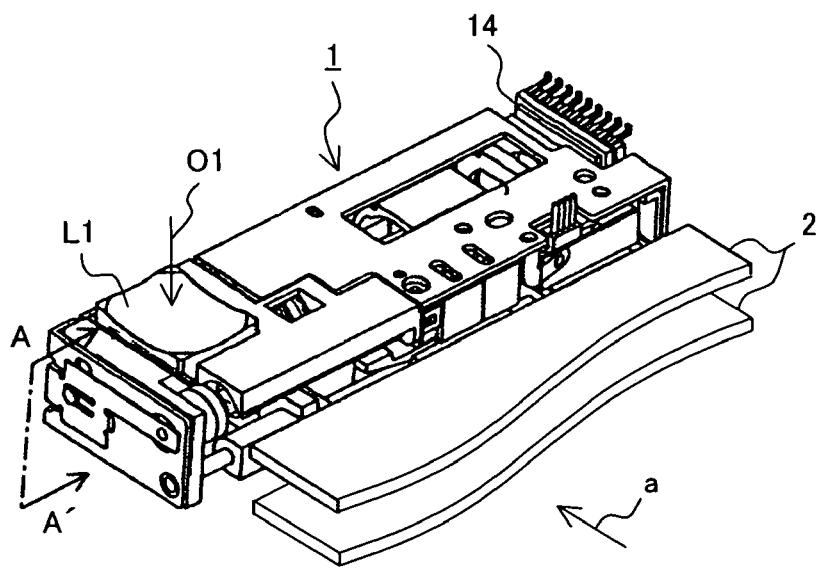
F I G. 1A
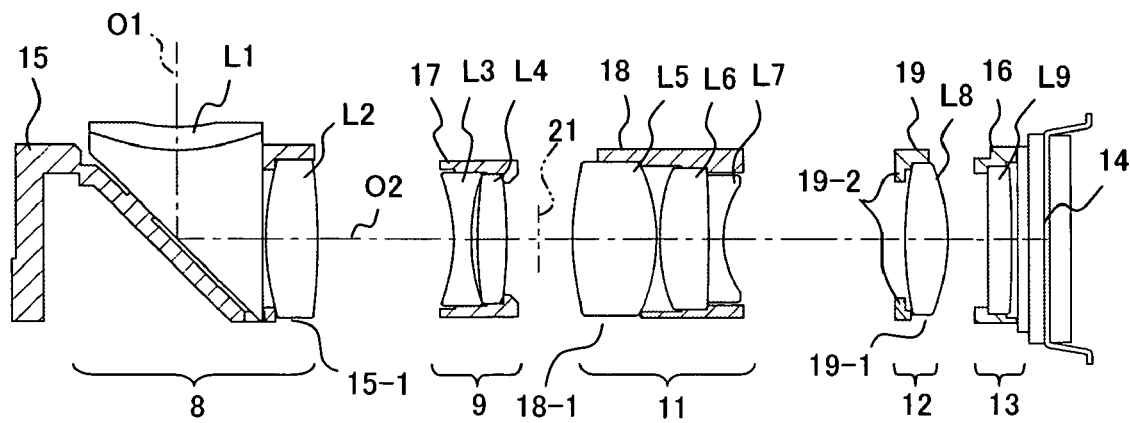
F I G. 1B

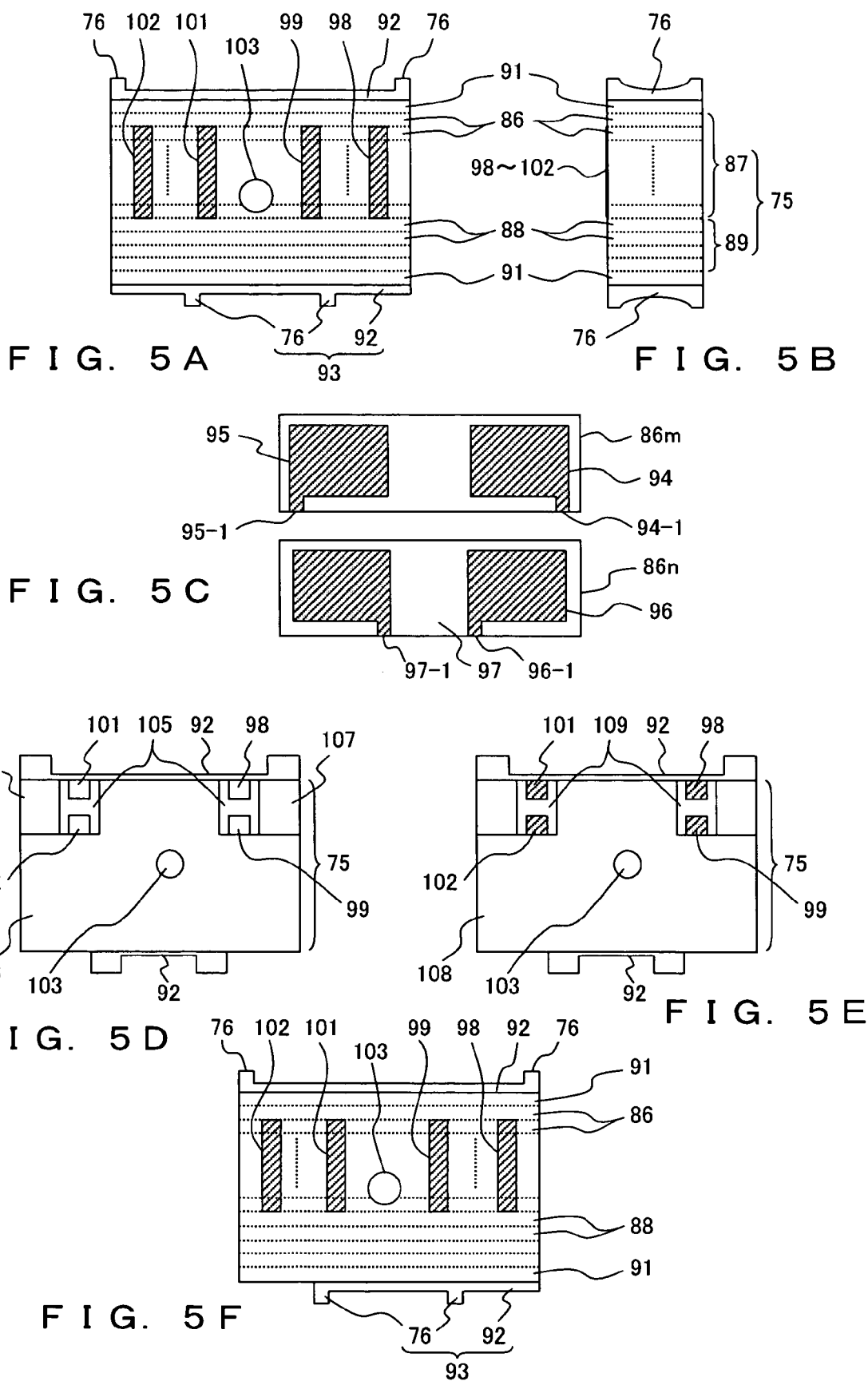

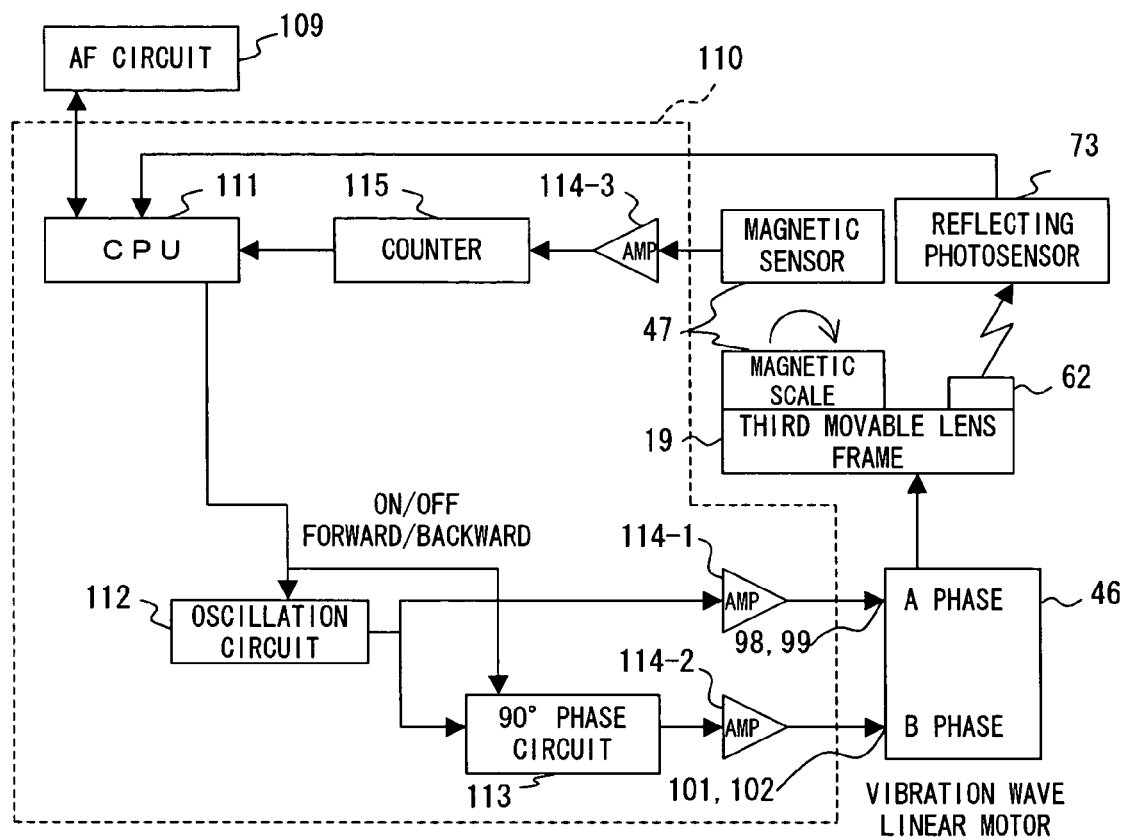
F I G. 6

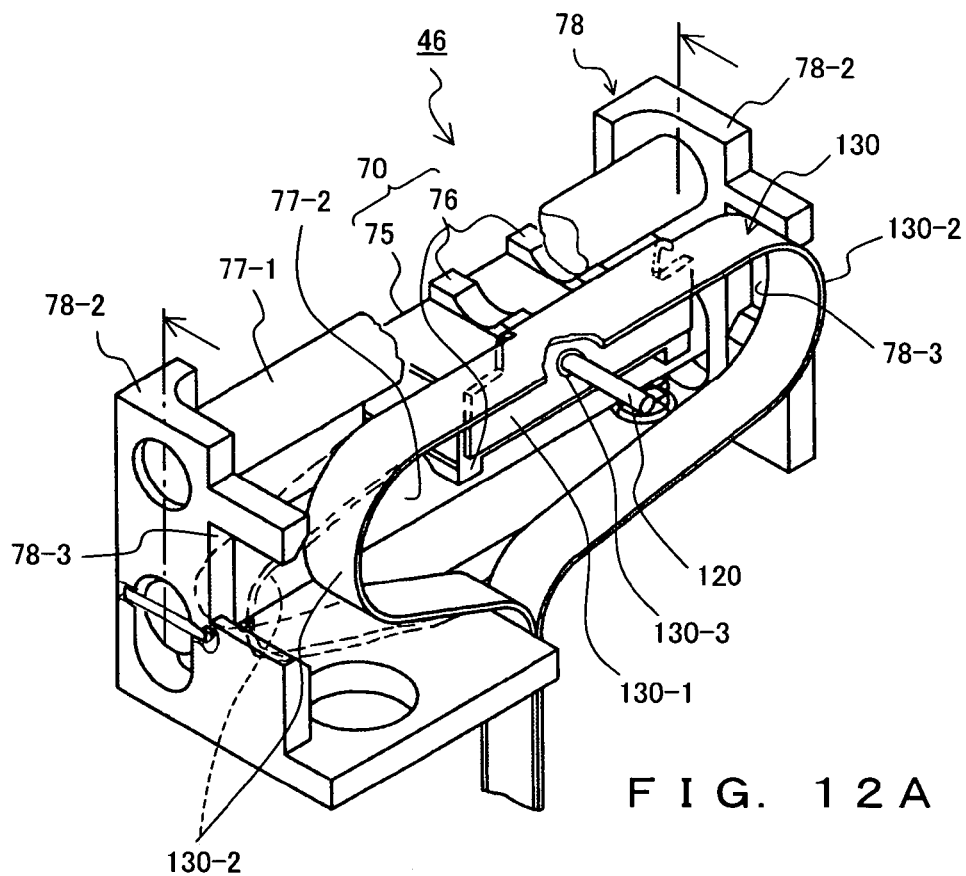
F I G. 1 2 A
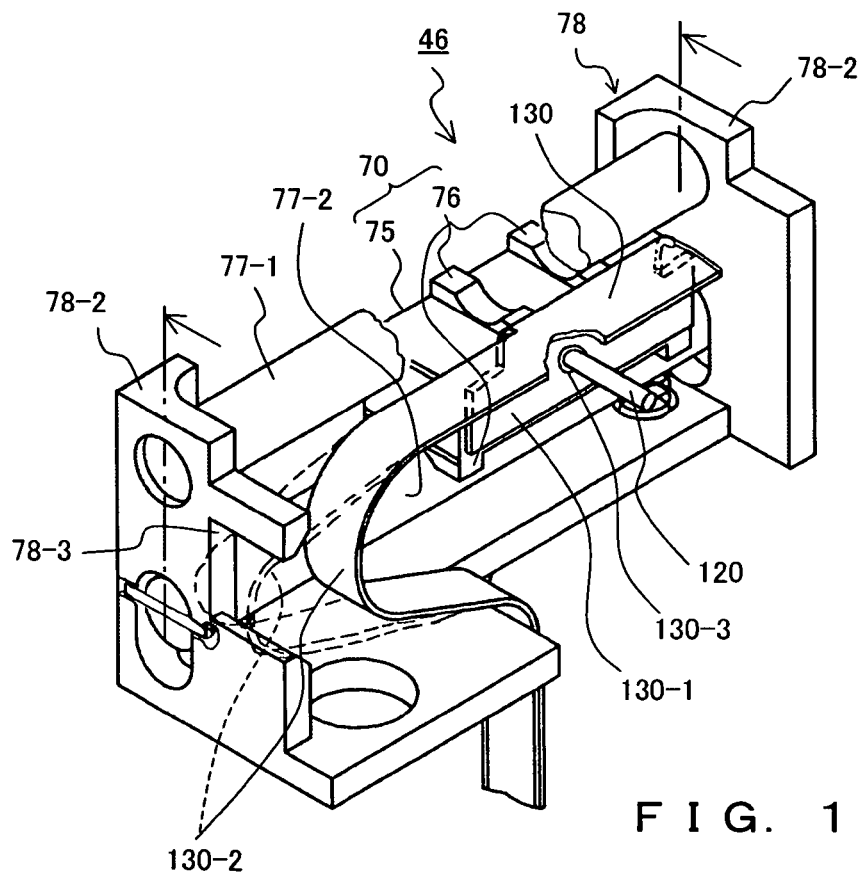
F I G. 1 2 B

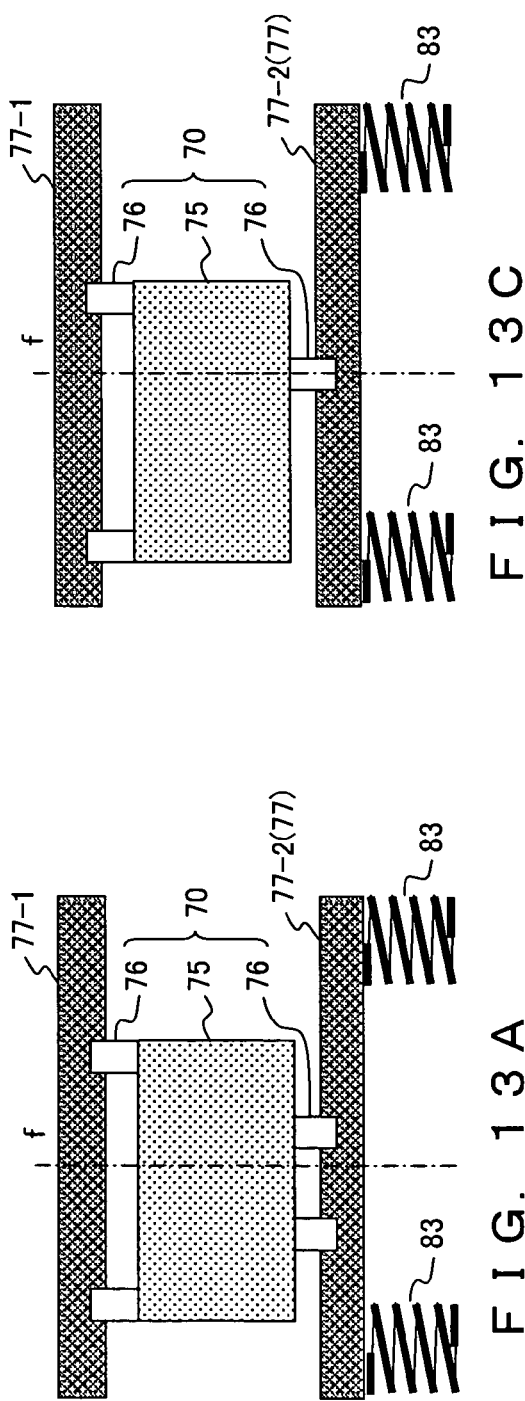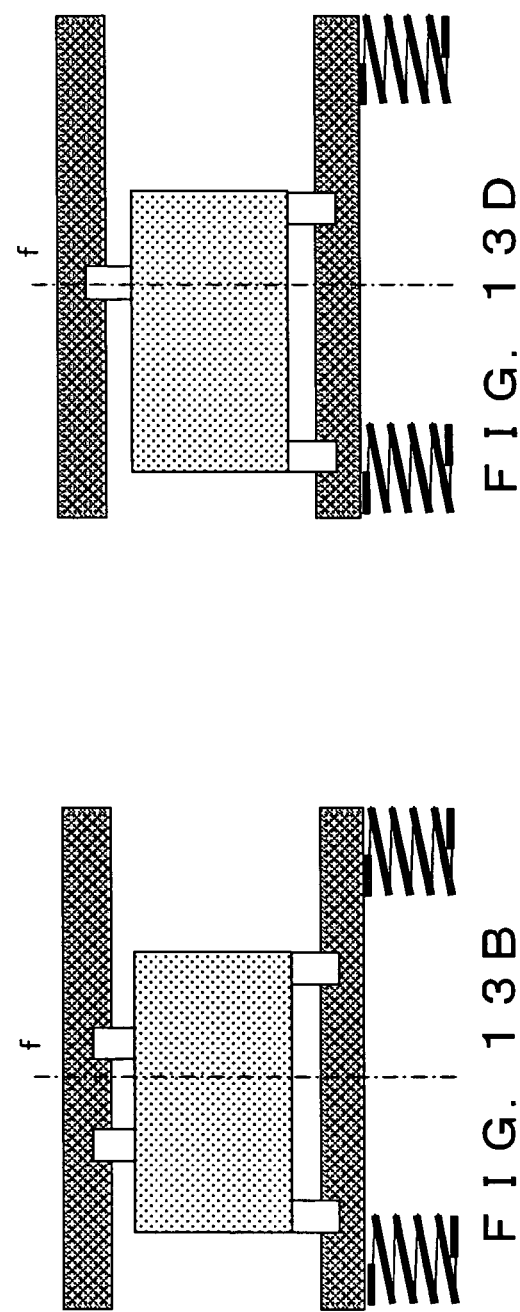

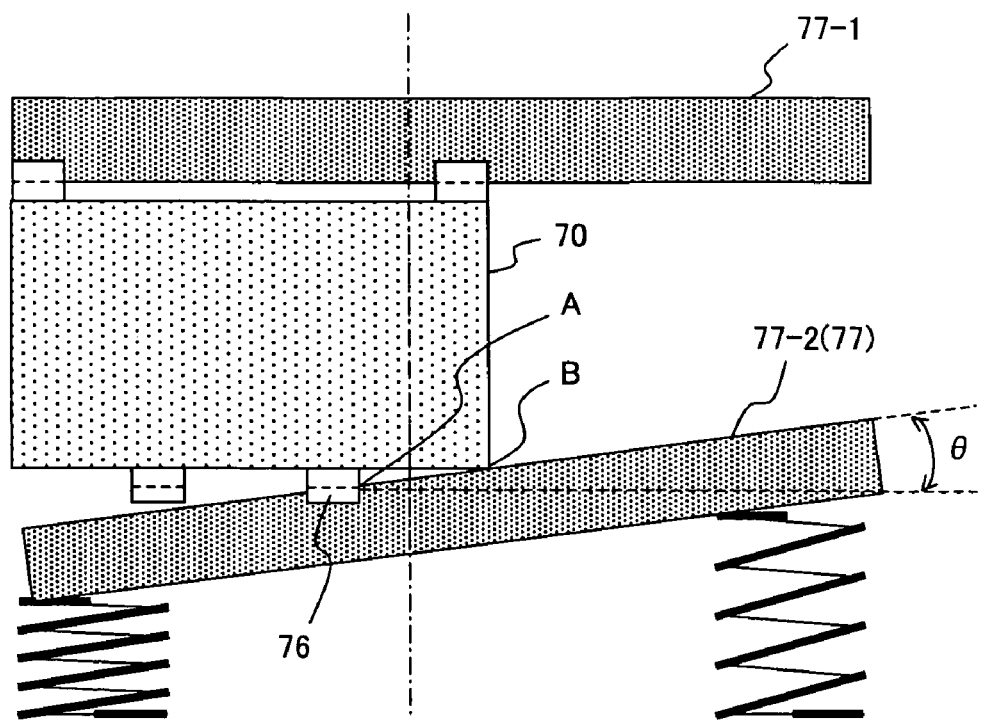
F I G. 1 6 A
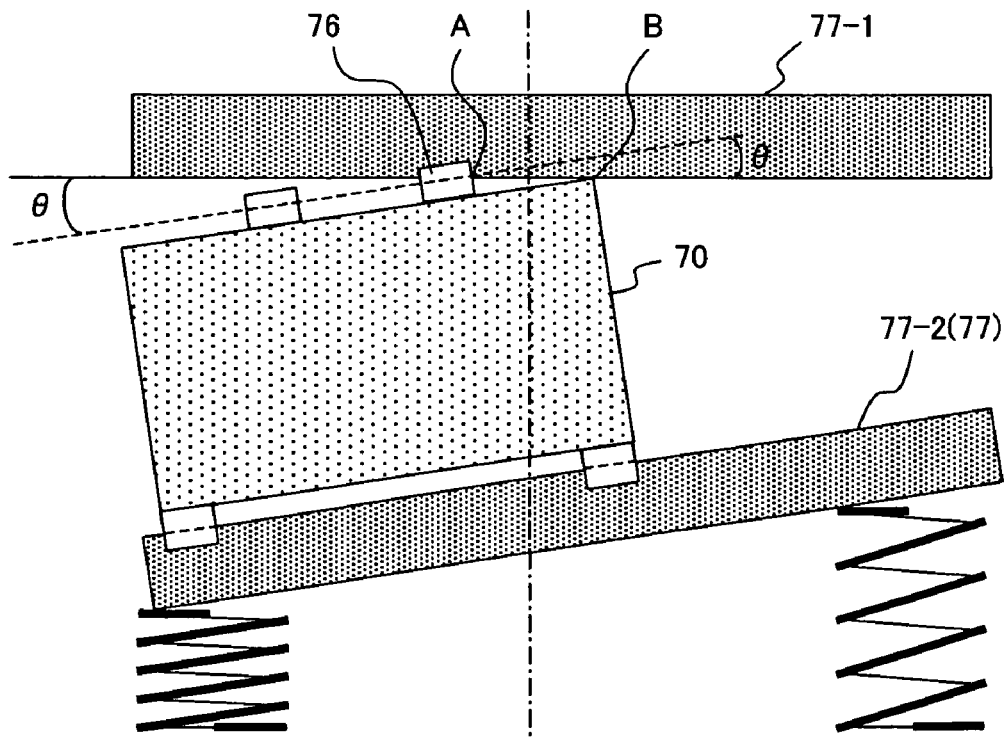
F I G. 1 6 B

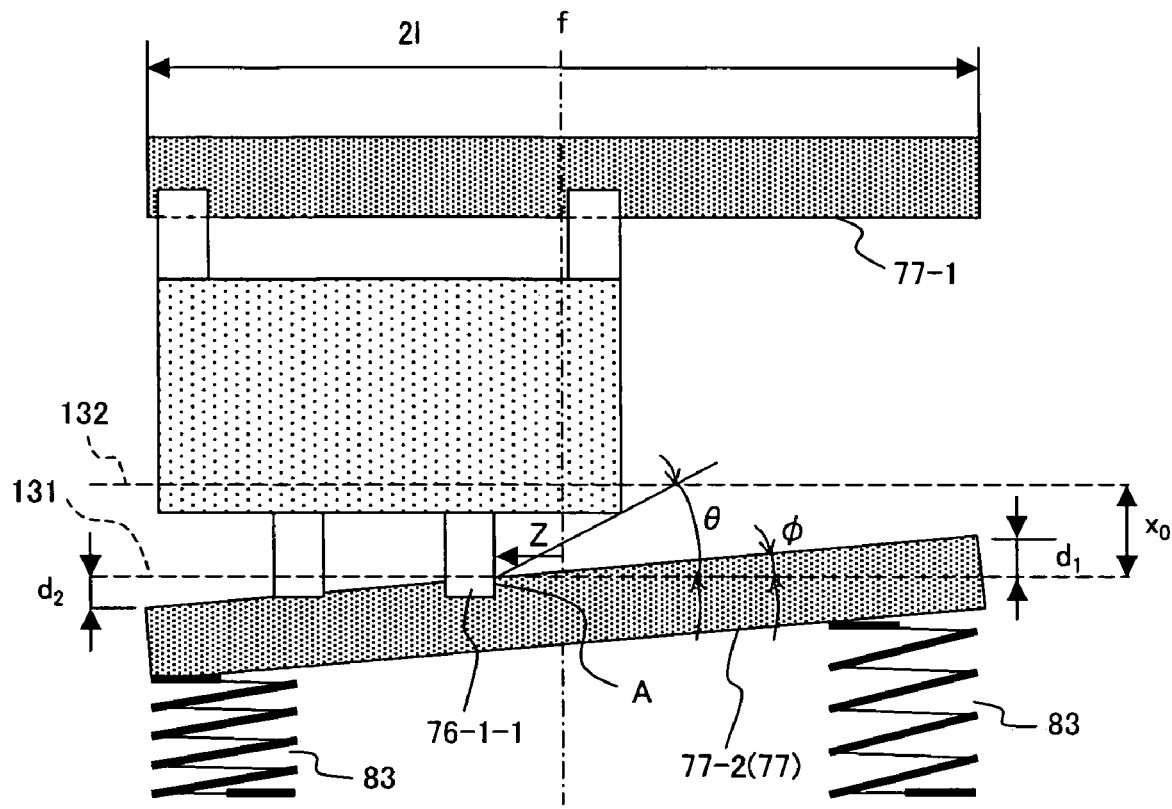
F I G. 17A
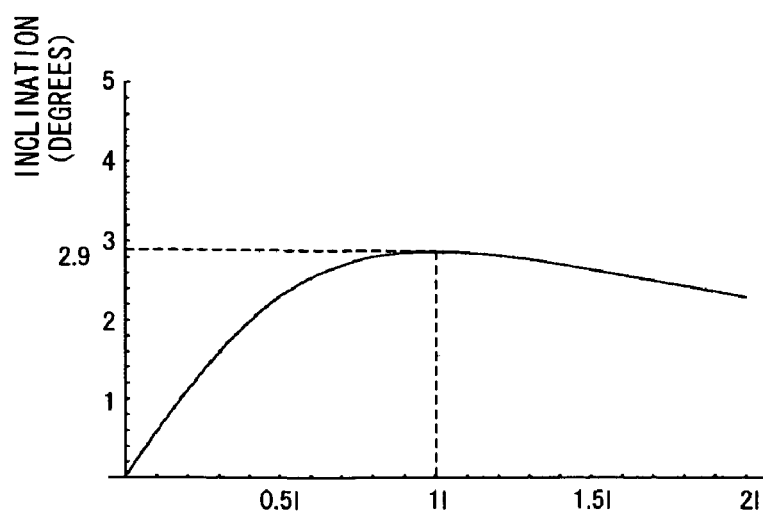
F I G. 17B

VIBRATION WAVE LINEAR MOTOR

CROSS REFERENCE TO RELATED APPLICATION

This application is based upon and claims the benefit of priority from the prior Japanese Application No. 2003-342865, filed Oct. 1, 2003, the entire contents of which are incorporated herein by reference.

BACKGROUND OF THE INVENTION

1. Field of the Invention

The present invention relates to a vibration wave linear motor using a vibrator, and more particularly, to a vibration wave linear motor that can be reduced in size with a simple configuration.

2. Description of the Related Art

In recent years, attention has been paid to an ultrasonic motor (vibration wave motor) as a new motor replacing an electromagnetic motor. This ultrasonic motor has advantages such that (a) high thrust at a low speed can be obtained without a gear, (b) holding force is high, (c) a stroke is long, and a resolution is high, (d) low noise is implemented, and (e) magnetic noise is not caused, and noise influence is not exerted, in comparison with a conventional electromagnetic motor.

As a conventional ultrasonic motor having such advantages, a linear-type ultrasonic motor as one basic form using an ultrasonic vibrator is proposed by the present applicant (for example, paragraphs [0035] to [0040], and FIGS. 7 and 18 of Japanese Patent Publication No. HEI07-163162).

Additionally, it is proposed by utilizing the above described characteristics that an ultrasonic motor is used as a driving source for moving a lens frame of a camera backward and forward by providing a vibrator integrally with the lens frame, which is a lens holding member, and by moving the lens frame backward and forward with reference to a fixed shaft with the vibrator (for example, see Abstract of the Disclosure, and FIG. 1 of Japanese Patent Publication No. HEI08-179184).

Also a card carrying apparatus using an ultrasonic motor is proposed. This ultrasonic motor comprises a ring-shaped vibration board that vibrates in multiple modes, and a pair of guide rails where grooves for guiding the vibration board are formed. As one of the guide rails, a movable rail is arranged, and presses the vibration board. As a result, the vibration board linearly moves along the guide rails by being vibrated (for example, see line 20 in the left column on page 3 to line 13 in the left column on page 4, and FIGS. 1 and 3 of Japanese Patent Publication No. HEI04-069072).

Furthermore, a linear ultrasonic motor that linearly moves a shaft by pressing a vibrator and the shaft to be driven with the use of a pressure roller, and by ultrasonic-vibrating the vibrator is proposed. Besides, it is recited that the cross section of the vibrator is made V-shaped or arc-shaped in the pressing portion of the vibrator and the shaft (for example, see "Abstract of the Disclosure, and FIG. 1 of Japanese Patent Publication No. HEI09-149664).

SUMMARY OF THE INVENTION

A vibration wave linear motor according to the present invention is a vibration wave linear motor comprising: a vibrator having a vibrator unit configured to comprise a piezoelectric unit, and driving contacting parts respectively provided on two opposed surfaces of the vibrator unit; first and second guide members sandwiching the vibrator via the driving contacting parts; a pressing part relatively pressing the second guide member toward the first guide member, and generating pressing force from the second guide member toward the first guide member; and a holding part fixing and holding the first guide member, and holding the second guide member to be movable in a direction of the pressing force, wherein the driving contacting parts convert a vibration generated by applying a voltage to the vibrator unit into driving force, whereby the vibrator and the two guide members make a relative move, and an inclination $\phi$, which occurs between the first guide member and the second guide member as the vibrator moves, is configured to be smaller than an inclination $\theta$, which is formed by a linear line connecting a driving contacting part that one of the first and the second guide members contacts and other portion on the vibrator, and the other guide member as opposed to the one guide member.

BRIEF DESCRIPTION OF THE DRAWINGS

FIG. 1A is a perspective view showing the outer appearance of a lens implement comprising a vibration wave linear motor according to the present invention;

FIG. 1B is a schematic showing a simplified configuration of respective lens units when a cross section, taken along an arrow line A–A', of the lens implement shown in FIG. 1A is viewed in the direction of an arrow a;

FIG. 5A is a front view of a vibrator of the vibration wave linear motor;

FIG. 5B is its side view;

FIG. 5C shows an arrangement of piezoelectric sheets and electrodes of the vibrator shown in FIGS. 5A and 5B;

FIGS. 5D and 5E show two examples of other configurations of the vibrator;

FIG. 5F shows an example of another shape of coupled driving contacting parts;

FIG. 6 is a circuit diagram showing a driving circuit driving and controlling the vibration wave linear motor;

FIG. 12A is a perspective view showing the vibration wave linear motor, and a flexible board which is branched and arranged between the external electrodes of the vibrator of the vibration wave linear motor and a driving circuit;

FIG. 12B is a perspective view showing a flexible board which is not branched;

FIGS. 13A to 13D respectively show a position relationship between a vibrator and a movable guide member (guide shaft pressed toward a guide shaft on a fixed side), which is a premise in second and succeeding preferred embodiments and does not cause an inclination in the movable guide member;

FIG. 16A shows an example, which is a premise in the second and succeeding preferred embodiments, where the movable guide member inclines as the vibrator moves, and contacts a portion other than driving contacting parts of the vibrator:

FIG. 16B shows another example;

FIG. 17A explains a relationship between an angle of an inclination of the movable guide member and the states of respective parts as the second preferred embodiment;

FIG. 17B is a graph of the angle of the inclination obtained from an equation of the relationship;

DESCRIPTION OF THE PREFERRED EMBODIMENTS

Figure 2:
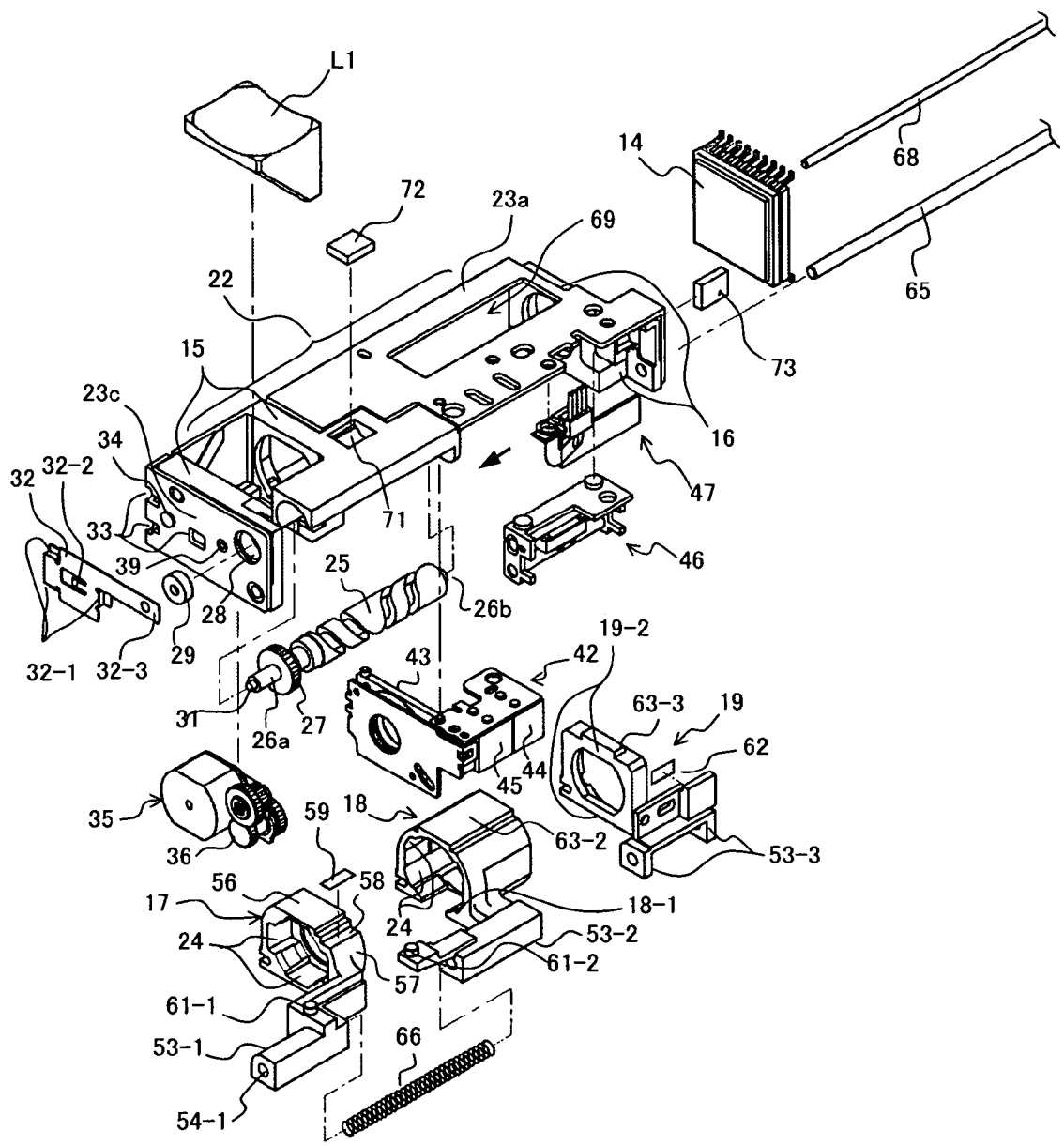
FIG. 2 is a perspective view showing the disassembly of the lens implement when viewed from upward.

Preferred embodiments according to the present invention are described below with reference to the drawings.

First Preferred Embodiment

<Lens Implement Comprising a Vibration Wave Linear Motor>

FIG. 1A is a perspective view showing the outer appearance of a lens implement comprising a vibration wave linear motor according to the present invention, whereas FIG. 1B is a cross-sectional view, taken along an arrow line A–A', of the lens implement shown in FIG. 1A when viewed in the direction of an arrow a in FIG. 1A, and shows a simplified configuration of respective lens units.

FIG. 1A also shows a portion of a circuit board 2 comprising a control circuit which controls the driving of respective units of the lens implement 1 assembled within the housing of a main body apparatus such as a camera, etc. along with the lens implement 1.

The lens implement 1 shown in FIG. 1A reflects a pencil of light from a subject, which is incident from a shooting lens window of the housing of a main body apparatus not shown to a lens L1 along a shooting optical axis O1 (indicated by the vertical direction in FIG. 1), to be bent almost at a right angle in the horizontal direction (an obliquely upper right direction in FIG. 1) by using a prism formed integrally with the lens L1. This lens implement 1 generates a captured image by guiding the incident pencil of light to an image capturing element 14, which is provided at the end (the end in the obliquely upper right direction in FIG. 1) of the lens implement 1 and configured, for example, by a CCD, etc., along the bent second optical axis O2 shown in FIG. 1B.

As shown in FIG. 1B, the lens implement 1 includes a plurality of lenses configured by a first fixed lens unit 8 composed of lenses L1 and L2, a first movable lens unit 9 composed of lenses L3 and L4, a second movable lens unit 11 composed of lenses L5, L6, and L7, a third movable lens unit 12 composed of a lens L8, and a second fixed lens unit 13 composed of a lens L9, along the second optical axis O2 bent in the horizontal direction. Additionally, the image capturing element 14 is arranged at the dead end of these lens groups.

The lens L1 of the first fixed lens unit 8 is formed integrally with a prism that changes the course of the pencil of light along the second optical axis O2 by reflecting the pencil of light from the subject, which is incident from the above described shooting lens window along the shooting optical axis O1, to be bent almost by 90° in the horizontal direction. The lens L1 is held by a first fixed lens frame unit 15 along with the lens L2, and fixed within the lens implement 1.

The first fixed lens frame unit 15 and the second fixed lens frame unit 16 are integrally formed by being molded with resin at the end of a metal frame, which will be described later and has an almost L-shaped cross section cut vertically with reference to the second optical axis O2, in a long side direction.

Between the first fixed lens frame unit 15 and the second fixed lens frame unit 16, a first movable lens frame 17 holding the first movable lens unit 9, a second movable lens frame 18 holding the second movable lens unit 11, and a third movable lens frame 19 holding the third movable lens unit 12 are arranged.

The first movable lens frame 17, the second movable lens frame 18, and the third movable lens frame 19 respectively hold the first movable lens unit 9, the second movable lens unit 11, and the third movable lens unit 12 to be independently movable along the second optical axis O2 that is bent almost at the right angle by the lens L1 (also referred to as the prism L1 hereinafter).

The first movable lens unit 9 and the second movable lens unit 11 are provided to change the focal distance of the pencil of light of the subject, which is incident along the second optical axis O2 of the optical system of the lens implement 1. In other words, the first movable lens frame 17 and the second movable lens frame 18, which respectively hold the first movable lens unit 9 and the second movable lens unit 11, are provided to adjust the zoom ratio of the lens system.

Additionally, the third movable lens unit 12 is provided to adjust a focus at which the pencil of light forms an image on the image capturing unit 14. In other words, the third movable lens frame 19 holding the third movable lens unit 12 is provided as a lens frame for achieving a focus, which can freely move in the direction of the second optical axis O2.

Furthermore, 21 between the first movable lens unit 9 and the second movable lens unit 11 indicates a position of an aperture.

Still further, in this lens unit, frame cut parts 15-1, 18-1, and 19-1 are formed by cutting a portion or the whole of frame walls (portions corresponding to the bottoms of the lenses in a lower portion in the example shown in FIG. 1B), in either of the upper and lower portions of the second optical axis O2, of the first fixed lens frame unit 15, the second movable lens frame 18, and the third movable lens frame respectively holding the first fixed lens unit 8, the second movable lens unit 11, and the third movable lens unit 12, which respectively include the lenses L2, L5, and L8 of relatively large diameters, in order to make the thickness in the direction of height (actually, a thickness in the direction of depth as a lens unit for shooting) as thin as possible.

For the second and the third movable lens frames 18 and 19, the strengths of which become weak by the amount of the cut frame walls, and which do not have another reinforced portion unlike the first fixed lens frame 15, a convex part which protrudes externally and will be described later, is provided on a side opposite to the cut parts with reference to the second optical axis O2, namely, on the frame walls on the top surface. The reason why the frame walls of the second and the third movable lens frames 18 and 19 on the top surface look slightly thick in FIG. 1B is that the cross sections of the convex parts are depicted.

Additionally, since the whole of the third movable lens frame 19 is thin and weak in the direction of a width, it can be possibly insufficient to make reinforcement only with the above described convex parts. Therefore, a protruding part 19-2 is provided to wrap from a lens barrel part formed on a side opposite to the cut part 19-1 formed at the bottom of the lens L8 toward the left hand side, which is out of range of the effective light beam of the lens L8.

FIG. 2 is a perspective view showing the disassembly of the lens implement 1 when viewed from upward.

Figure 3:
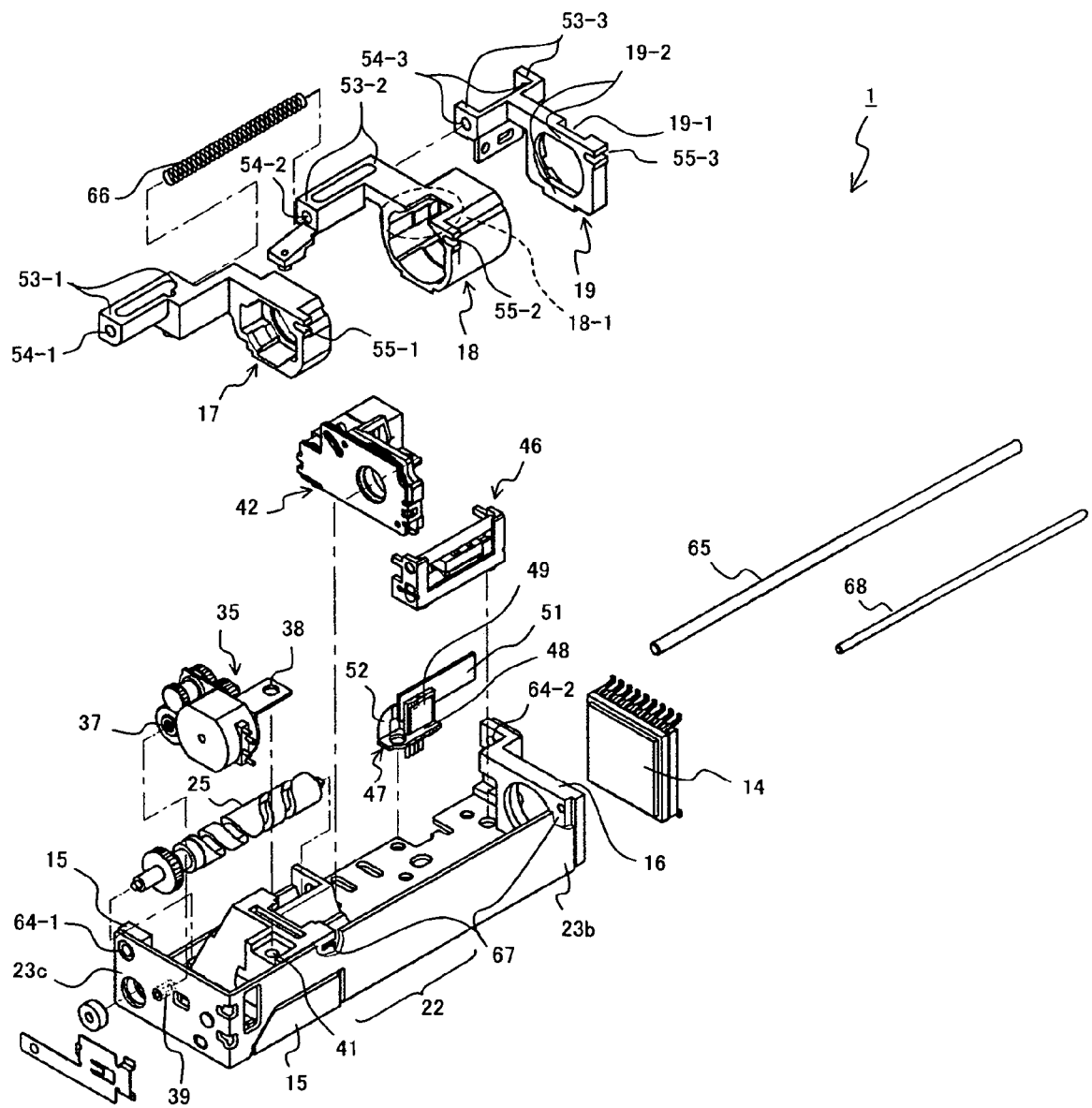
FIG. 3 is a perspective view showing the disassembly of the lens implement upside down when viewed from downward.

FIG. 3 is a perspective view showing the disassembly of the lens implement 1 upside down when viewed from downward. In FIGS. 2 and 3, the same constituent elements as those shown in FIGS. 1A and 1B are denoted with the same reference numerals.

As shown in FIGS. 2 and 3, the lens implement 1 comprises a main fixed lens frame 22. When all of the constituent elements shown in FIG. 2 or 3 are assembled and accommodated inside and outside the main fixed lens frame 22, the whole of the lens implement 1 has an outer shape, shown in FIG. 1A, of the main body of the apparatus where the constituent elements are comprised on two main surfaces of opposed rectangles, and included in a flat space enclosed by the two main surfaces.

The above described main fixed lens frame 22 comprises a metal frame 23a forming at least one of the above described 2 main surfaces. In the configuration of this lens implement 1, the other main surface is made open. Also one side surface of the flat space enclosed by the one main surface formed by the metal frame 23a and the other open main surface is configured by a metal frame 23b provided almost at a right angle from the metal frame 23a being the one main surface.

Additionally, also one side surface in the short side direction (the side surface in the obliquely lower left short side direction in FIGS. 2 and 3) is configured by a metal frame 23, which is almost perpendicular to the metal frame 23a being the main surface, and the metal frame 23b being the side surface in the long side direction.

In this way, the metal frames 23 (23a, 23b) configure an L-shaped metal frame whose cross section perpendicular to the long side direction (also the above described bent direction of the second optical axis O2) is composed of one main surface and one side surface in the long direction, and a frame having an ideal structure implementing high rigidity with a small amount of a material.

At both ends of the metal frame 23 in the long side direction, a fixed molded part formed integrally with the metal frame 23 by using outsert molding is respectively formed. These two fixed molded parts are the first fixed lens frame unit 15 and the second fixed lens frame unit 16, which are also shown in FIG. 1B.

In the first fixed lens frame unit 15, the prism L1 also shown in FIG. 1B, and the lens L2 not shown in FIGS. 2 and 3 are held and fixed. Additionally, in the second fixed lens frame unit 16, the lens L9 which is shown in FIG. 1B but not shown in FIGS. 2 and 3 is held and fixed.

Between the first fixed lens frame unit 15 and the second fixed lens frame unit 16, the 3 movable lens frames (the first movable lens frame 17, the second movable lens frame 18, and the third movable lens frame 19), which are also shown in FIG. 1B, are arranged.

In the three movable lens frames and the two fixed lens frames, an adhesive storing part 24 (see FIG. 2), which prevents an adhesive holding and fixing a lens from overflowing. The adhesive storing part 24 is a tiny space formed between the round surface of the fixed lens and the lens frame.

Adhesive storing parts of the third movable lens frame 19 and the second fixed lens frame unit 16 are not shown in FIGS. 2 and 3 because they are hidden. An adhesive storing part of the first fixed lens frame unit 15 is provided in a portion corresponding to the side surface of the prism formed integrally with the lens L1, although this is not shown.

Before the above described three movable lens frames are assembled, a zooming shaft cam 25 is arranged adjacently to the side surface of the main fixed lens frame 22 on the open side in the long side direction, and to the side surface of the first fixed lens frame unit 15. The zooming shaft cam 25 comprises a large diameter part forming a round surface on which cam grooves of a cam unit is provided, and small diameter parts 26 (26a, 26b) that are provided to protrude from both of the ends of the large diameter part on the shaft. In the small diameter part 26a that is provided to protrude at the end on the side opposite to the image capturing element 14, a gear 27 is fixed.

After the small diameter part 26a of the zooming shaft cam 25 is inserted into a shaft bearing insertion hole 28 formed in a part bonded integrally with the metal frame 23c of the first fixed lens frame unit 15, the other small diameter part 26*b* is inserted into a shaft bearing hole which is hidden and not shown, and formed in the first fixed lens frame unit 15 while pulling the zooming shaft cam 25 in the obliquely right direction in FIG. 2, so that the small diameter part 26*a* is engaged with a shaft bearing 29 in the shaft bearing insertion hole 28. As a result, the zooming shaft cam 25 is held to be rotatable for the first fixed lens frame unit 15.

At the tip of the small diameter part 26*a* of the zooming shaft cam 25, a convex part 31 having a smaller diameter is formed. The convex part 31 externally protrudes upward from the shaft bearing 29 when the small diameter part 26*a* engages with the shaft bearing 29. This convex part 31 is pressed by a pressing board spring 32, whereby the zooming shaft cam 25 is aligned by the upper and the lower shaft bearings to be stably supported.

The pressing board spring 32 is configured by: 3 bent leg parts 32-1 formed by separating a portion of each leg with a notch from an almost square main body, by being bent downward, and by bending the tip to be horizontal; a stop section 32-2 formed by cutting the center of the main body; and a pressing spring part 32-3 formed by being extended integrally from the main body.

In the meantime, on the side of the metal frame 23*c*, 3 notches 33 are formed in positions corresponding to the 3 bent leg parts 32-1 of the pressing board spring 32, and a convex part 34 corresponding to the stop section 32-2 of the pressing board spring 32 is formed almost at the center enclosed by the 3 notches 33.

When the main body of the pressing board spring 32 is pushed into the side of the metal frame 23*c* while engaging the 3 bent leg parts 32-1 of the pressing board spring 32 with the 3 notches 33 of the metal frame 23*c*, the tip of the stop section 32-2 engages with the rim of the convex part 34. As a result, the pressing board spring 32 is fixed on the outer surface of the metal frame 23*c*, and the convex part 31 of the zooming shaft cam 25 is pressed by the tip of the pressing spring unit 32-3, so that the zooming shaft cam 25 is aligned.

As a result, the zooming shaft cam 25 is arranged in the neighborhood of the prism L1 held by the first fixed lens frame unit 15 to be orientated in the long side direction of the main fixed lens frame 22, namely, in parallel with the second optical axis O2, and arranged so that at least a portion in the shaft direction is adjacent to the side surface of the prism L1.

Then, a zooming motor unit 35 is arranged in a space (see FIG. 3) shaped almost like a triangle pole, which is formed by a slope of the first fixed lens frame unit 15 holding the back side of the reflection plane of the lens (prism) L1, and the metal frame 23*c*, and its reduction gear train 36 engages with the gear 27 of the zooming shaft cam 25. The zooming motor unit 35 is fixed to the first fixed lens frame unit 15 by securing with screws two securing parts (see FIG. 3) of a gear shaft fixing part 37 and a stop board fixing part 38 to an alignment hole 39 formed on the first fixed lens frame unit 15 and to a stop hole 41.

Then, an aperture/shutter unit 42 is assembled to the main fixed lens frame 22. The aperture/shutter unit 42 (see FIG. 2) comprises an aperture/shutter part 43 having an aperture which controls the amount of passing light of reflection light forming the second optical axis O2, and a shutter, and rotary solenoids 44 and 45 which respectively drive the aperture and the shutter of the aperture/shutter part 43 in a mechanical manner.

The aperture/shutter part 43 is arranged in the position 21 of the aperture shown in FIG. 1B, and the two rotary solenoids 44 and 45 are arranged below the zooming shaft cam 25.

Furthermore, a vibration wave linear motor 46 for moving and driving the third movable lens frame 19, and a magnetic sensor unit 47 are aligned to overlay in the short side direction of the main fixed lens frame 22 below the aperture/shutter unit 42.

As a result, the vibration wave linear motor 46 is arranged in the position in the direction where the shaft of the zooming shaft cam 25 is extended, and on the side of the image capturing surface.

The magnetic sensor unit 47 (see FIG. 3) comprises a magnetic sensor holder 48, a magnetic sensor 49, a magnetic scale 51, and a pressing spring 52.

The above described vibration wave linear motor 46 and magnetic sensor unit 47 will be described in detail later.

After the above described members are arranged in this way, the first movable lens frame 17, the second movable lens frame 18, and the third movable lens frame 19, to which the movable lens units 9, 11, and 12 shown in FIG. 1B (but not shown in FIGS. 2 and 3) are respectively fixed with an adhesive, are assembled.

The top and the bottom (the top and the bottom also in FIG. 1B) of each of the lenses L3 to L8 of the movable lens units 9, 11, and 12, which are respectively held by the first movable lens frame 17, the second movable lens frame 18, and the third movable lens frame 19 and shown in FIG. 1B, for the lens implement 1 shown in FIG. 1A are cut, and the top and the bottom surfaces form flat surfaces, and the lenses are shaped like an oval when viewed at the front, although this is not clearly shown in FIG. 1B because it is the cross-sectional side view.

Additionally, the top and the bottom surfaces (the top and the bottom of the lens implement 1 shown in FIG. 1A, and the top and the bottom of the lens unit shown in FIG. 1B) along the second optical axis O2 are formed to be flat so that the circumferences of the lens holding units of the first, the second, and the third movable lens frames 17, 18, and 19 hold the oval-shaped lens. This leads to a reduction in the thickness of the movable lens frames embedded in the lens implement 1.

For a further reduction in the thicknesses of the second and the third movable lens frames 18 and 19, frame walls, which correspond to the flat surfaces of the bottoms of the lenses, of the bottoms (the bottom portions in FIG. 2, and the top portions in FIG. 3) of the lens frames holding the lenses are cut to form cut parts 18-1 and 19-1, which are shown in FIG. 1B, and the flat parts of the bottoms of the lenses are exposed.

The above described cut part of the second movable lens frame 18 is shown in FIGS. 2 and 3. However, the cut part of the third movable lens frame 19 is not shown because it is hidden by the remaining peripheral portion of the lens frame.

The first movable lens frame 17, the second movable lens frame 18, and the third movable lens frame 19 (see FIG. 2) respectively comprise shaft bearing parts 53 (53-1, 53-2, 53-3), in which guide holes 54 (54-1, 54-2, 54-3) are respectively provided.

Additionally, the first movable lens frame 17, the second movable lens frame 18, and the third movable lens frame 19 respectively comprise U-shaped cut parts 55 (55-1, 55-2, 55-3) at ends as opposed to the shaft bearing parts 53 (see FIG. 2).

Furthermore, a light reflecting member 59 is attached and arranged in a stage height part 58 formed in a boundary between a front outer surface 56 (see FIG. 2) as opposed to the back end portion, which has the above described shaft bearing parts 53 and the U-shaped cut parts 55, and a side surface 57 where the shaft bearing parts 53 of the first movable lens frame 17 are arranged.

Still further, cam followers 61 (61-1, 61-2) are respectively formed in a portion which is provided to protrude at the side integrally with the shaft bearing part 53-1 of the first movable lens frame 17, and in a portion which is provided to extend integrally with the shaft bearing part 53-2 of the second movable lens frame 18.

Still further, a light reflecting member 62 is attached to a side surface that is provided to be erected in the horizontal direction integrally with the shaft bearing part 53-3 of the third movable lens frame 19.

Still further, convex parts 63 (63-2, 63-3) for reinforcement, which are explained with reference to FIG. 1B, are formed on the outer surface on the front end as opposed to the back end having the shaft bearing parts 53 and the U-shaped cut parts 55.

These convex parts 63 are provided to reinforce the strengths of the lens frames, which are insufficient due to the cut wall frames corresponding to the back flat portions of the oval lenses in order for a reduction in the thickness of the entire apparatus.

Additionally, a first guide member 65, both ends of which are supported by guide member supporting holes 64 (64-1, 64-2) formed at corners respectively closest to the open side surface and the open main surface of the first fixed lens frame unit 15 and the second fixed lens frame unit 16, is inserted into guide holes 54 of the three movable lens frames.

As a result, the first, the second, and the third movable lens frames 17, 18, and 19 (namely, the 3 movable lens units 9, 11, and 12) are supported to be movable in the direction of the second optical axis O2 shown in FIG. 1B.

Furthermore, the guide member supporting holes (64-1, 64-2) supporting the first guide member 65 are formed at the corners closest to the open side surface and the open main surface, whereby the first guide member 65 is arranged to be as close as possible to an outermost portion, in which the open side surface and the open main surface join, within the lens implement 1 formed b the main fixed lens frame 22. The first guide member 65, which is arranged to be as close as possible to the outermost portion, is supported by the shaft bearing parts 53, whereby the 3 movable lens frames are arranged within the narrow and flat main body of the apparatus without wasting space.

When the first guide member 65 is inserted, a compressed spring 66 having pressing force is externally attached to the first guide member 65 between the shaft bearing part 53-1 of the first movable lens frame 17 and the shaft bearing part 53-2 of the second movable lens frame 18.

Additionally, a second guide member 68 is arranged by supporting its both ends with other 2 guide member supporting holes 67 (see FIG. 3) formed in positions, which are closest to the closed side surface and the open main surface configured by the metal frame 23b, of the first fixed lens frame unit 15 and the second fixed lens frame unit 16, before the 3 movable lens frames are assembled.

The respective movable lens frames are rotated inside by using the second guide member 68 as a pivot line after the above described U-shaped cut parts 55 are supported to freely slide by fitting into the second guide member 68 horizontally, whereby the cam followers 61 provided in the first movable lens frame 17 and the second movable lens frame 18 freely and smoothly penetrate into the cam grooves of the zooming shaft cam 25 to engage with, when the 3 movable lens frames are assembled.

Namely, cams (the cam grooves with which the cam followers 61-1 and 61-2 engage), which respectively correspond to a plurality of lens frames (the first movable lens frame 17 and the second movable lens frame 18 in this example) are respectively formed in the zooming shaft cam 25.

The cam followers 61 penetrate into the cam grooves of the zooming shaft cam 25 as described above, whereby the zooming shaft cam 25, and the first movable lens frame 17 and the second movable lens frame 18 engage with each other to freely slide.

Additionally, the top outer surface 56 (see FIG. 2) of the first movable lens frame 17 is arranged to be close to the back side of the metal frame 23a forming one main surface, and the convex parts 63 for reinforcement, which are formed on the front outer surfaces of the second movable lens frame 18 and the third movable lens frame 19, penetrate into an opening part 69 also formed on the metal frame 23a.

This opening part 69 forms an opening which is vertically long according to the move stroke of a movable lens in order to avoid an interference with the move of a movable lens (see the lenses L5 to L8 shown in FIG. 1B) that moves with the move of the second movable lens frame 18 or the third movable lens frame 19, namely, in order not to prevent the convex parts 63 from moving.

Hereafter, the above described first guide member 65 is inserted into the guide hole 54 of the shaft bearing parts 53 of the movable lens frames, and the guide member supporting holes 64 at both of the ends. As a result, the two guide members (65, 68) are arranged to be adjacent to the zooming shaft cam 25 and in parallel with the shaft of the zooming shaft cam 25.

As described above, the shaft members are arranged to be adjacent and in parallel, which contributes to a reduction in the size of the entire apparatus.

By being supported by the two guide members, the three movable lens frames (17, 18, 19) are controlled to be able to slide in the direction of the optical axis O2, prohibited by one of the guide members from rotating about the other, and aligned in a direction perpendicular to the optical axis O2, so that the movable lens frames are arranged within the main fixed lens frame 22.

Additionally, the compressed spring 66 is arranged between the shaft bearing part 53-1 of the first movable lens frame 17 and the shaft bearing part 53-2 of the second movable lens frame 18 by being externally attached to the first guide member 65, whereby the first movable lens frame 17 and the second movable lens frame 18 are pressed in the mutually reverse directions.

As a result, the cam followers 61-1 and 61-2, which respectively engage with the cam grooves of the zooming shaft cam 25, are respectively pressed against the opposite sides of the wall of the cam grooves of the zooming shaft cam 25. Accordingly, a play occurring between the cam grooves and the cam followers when the zooming shaft cam 25 is driven to rotate is eliminated. As a result, a position relationship when the lens frames move to the left or the right is properly controlled.

In the above described arrangement, the first guide member 65 is arranged to be adjacent and almost in parallel with the zooming shaft cam 25.

Hereafter, the image capturing element 14 is installed on the bottom surface of the second fixed lens frame unit 16. Additionally, a photosensor installment hole 71 is provided in a position, which corresponds to the light reflecting member 59 attached to the first movable lens frame 17, on the surface of the first fixed lens frame unit 15, which exists on the same surface of the metal frame 23a. A photosensor 72 is arranged in this photosensor installment hole 71.

This photosensor 72 detects the absolute position of the first movable lens frame. The move distance of the first movable lens frame from the detected absolute position is determined in a way such that the number of steps of a zoom motor of a zooming motor unit 35, which is driven in steps, is counted by a control device not shown.

Additionally, another photosensor 73 is arranged in a position, which corresponds to the light reflecting member 62 attached to the third movable lens frame 19, on a side facing the open side surface of the second lens frame unit 16. This photosensor 73 detects the absolute position of the third movable lens frame 19 by detecting the light reflected from the light reflecting member 62 attached to the third movable lens frame 19.

After these absolute positions are determined, the zooming shaft cam 25 rotates in both forward and backward directions within a predetermined angle range by means of the forward and backward rotations of the motor of the zooming motor unit 35. The cam follower 61-1 of the first movable lens frame 17, and the cam follower 61-2 of the second movable lens frame 18 respectively engage with the two cam grooves provided on the outer round surface of the zooming shaft cam 25, whereby the first movable lens frame 17 and the second movable lens frame 18 (namely, the first movable lens unit 9 and the second movable lens unit 11) move close to or apart from each other in the direction of the second optical axis O2. As a result, the image of the pencil of light proceeding in the direction of the optical axis O2 is zoomed in/out.

Additionally, the aperture/shutter unit 42, where the aperture/shutter part 43 is arranged in the aperture position 21 between the first and the second movable lens units 9 and 11 in FIG. 1B, opens/closes the course of the pencil of light proceeding in the direction of the optical axis O2, and an optical filter (ND filter) that controls the amount of light on the image capturing surface is moved forward and backward within the course of the pencil of light.

A vibration wave linear motor that drives the move of the third lens frame holding the third movable lens unit 12 for achieving a focus is described next.

<Entire Configuration of the Vibration Wave Linear Motor>

Figure 4A:
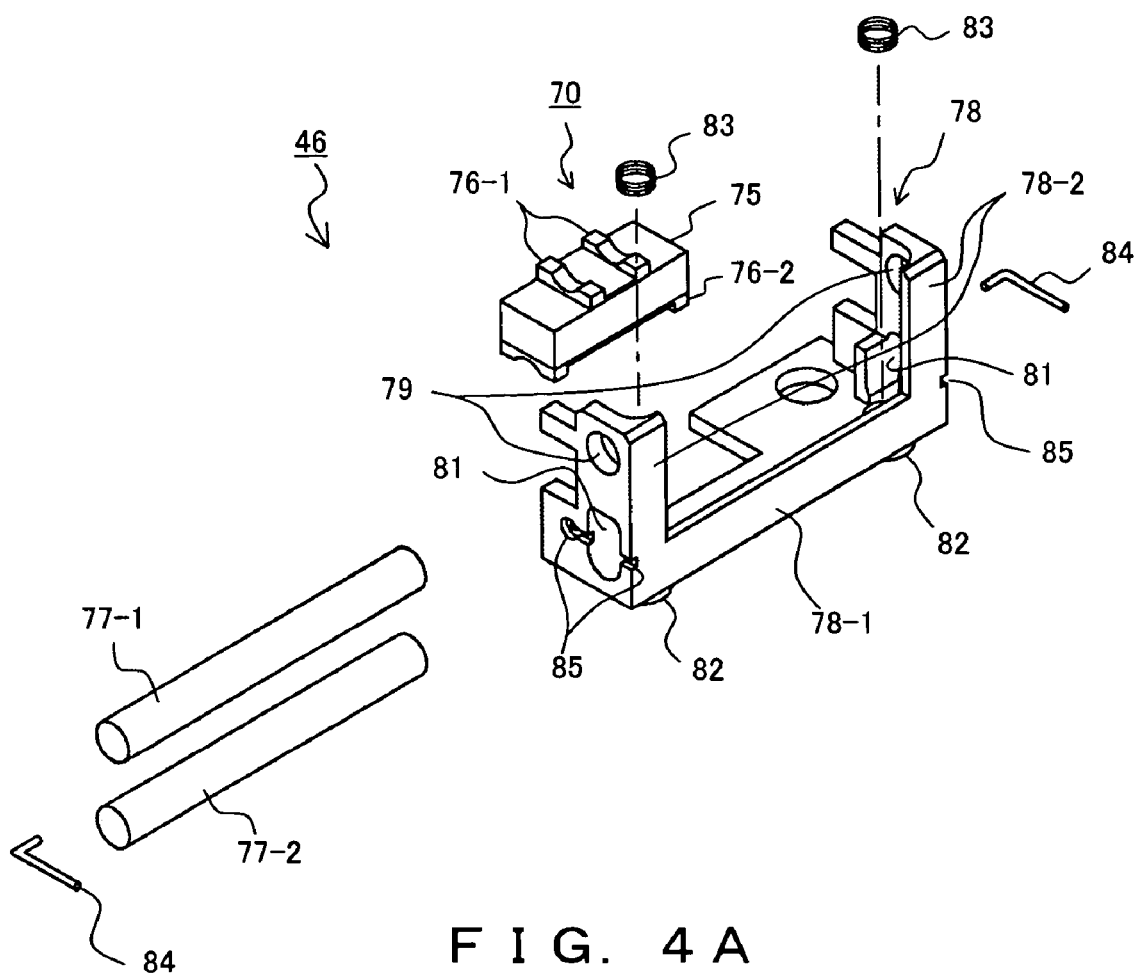
FIG. 4A is a perspective view showing the disassembly of an ultrasonic linear motor according to one preferred embodiment.
Figure 4B:
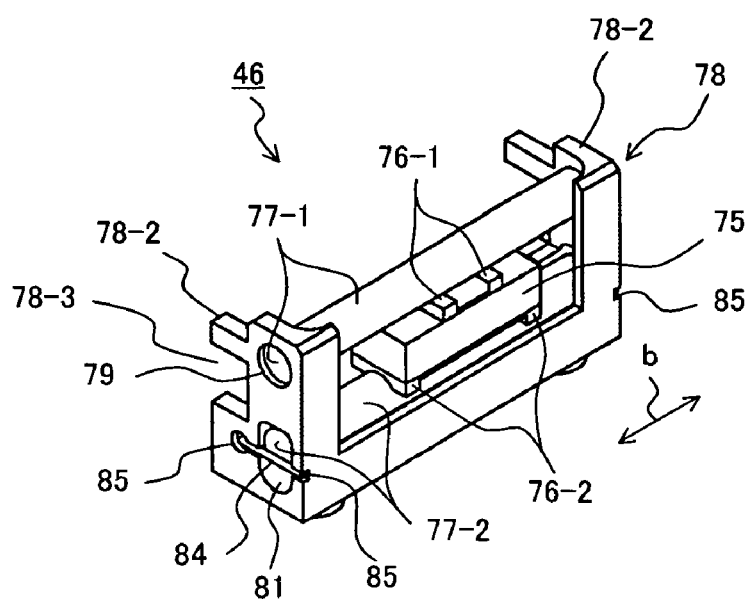
FIG. 4B is a perspective view showing the assembled state of the ultrasonic linear motor shown in FIG. 4A.

FIG. 4A is a perspective view showing the disassembly of the vibration wave linear motor used in this preferred embodiment, whereas FIG. 4B is a perspective view showing its assembled state. As shown in FIGS. 4A and 4B, the vibration wave linear motor 46 comprises a vibrator composed of a vibrator unit 75 shaped like a rectangular parallelepiped, and pluralities (respectively two in this figure) of protruding contacting parts 76 (76-1, 76-2), which are formed integrally with or separately from the vibrator unit 75 on opposed two top and bottom surfaces of the vibrator unit 75.

The vibrator unit 75 is shaped like a rectangular parallelepiped without concave and convex portions as described above, whereby the entire motor can be easily reduced in size. Additionally, the driving contacting parts 76 are comprised on the opposed two surfaces, whereby high driving force can be delivered.

The vibration wave linear motor 46 further comprises two guide members 77 (77-1, 77-2) guiding the self-running move of the vibrator 70 by sandwiching the vibrator unit 75 in parallel with the move direction via the driving contacting parts 76 of the vibrator 70, and supporting parts 78 supporting the entire vibrator while aligning the round-bar-state two guide members 77. The driving contacting parts 76 are formed to protrude respectively in the directions of the guide members 77 on their arrangement surfaces.

In the supporting part 78, fixed shaft bearing holes 79 supporting the upper guide member 77-1 among the two guide members 77 by attaching and fixing the member are formed in upper portions of erecting parts 78-2, which are formed integrally with a base part 78-1 from both ends of the base part 78-1. Under the holes 79, shaft bearing long holes 81 supporting the lower guide member 77-2 to freely move up and down are formed. In the erecting parts 78-2 of the supporting part 78, open parts 78-3 are formed at the side of supporting the two guide members 77.

Additionally, at the bottom surface in the neighborhoods of both of the ends of the base part 78-1 of the supporting part 78, convex parts 82 are respectively provided in positions, which correspond to both of the ends of the lower guide member 77-2 inserted in the shaft bearing long holes 81. The convex parts 82 are hollow when viewed from upward although this is not shown, and spiral (coil) springs 83 having pressing force are held in the hollow portions.

Furthermore, the top ends of the spiral springs 83, which protrude upward from the hollow portions, press the lower guide member 77-2 in the neighborhoods of both of its ends, namely, toward the upper guide member 77-1. As a result, the lower guide member 77-2 is pressed against the driving contacting parts 76 on the bottom surface of the vibrator 70, which the lower guide member 77-2 sandwiches along with the upper guide member 77-1, and supported by the shaft bearing long holes 81 to be movable up and down by means of a vibration of the vibrator 70, which will be described later, and the pressing force of the spiral springs 83.

The lower guide member 77-2 is supported by the shaft bearing long holes 81 to be movable up and down as described above, whereby an assembly error between the guide members 77 can be easily absorbed, and the entire apparatus can be easily reduced in size.

Additionally, the lower guide member 77-2 is pressed with the spiral springs 83 in the neighborhoods of both of the ends of the lower guide member 77-2, whereby the lower guide member 77-2 can be evenly pressed against the vibrator 70 over the entire proceeding direction of the vibrator 70. Accordingly, the driving contacting parts can be stably pressed against the guide members 77 all the time in whichever position the vibrator exists. As a result, the stable forward and backward move of the vibrator 70 can be implemented.

Here, the upper and the lower guide members are referred to as the two guide members 77. However, the lower guide member 77-2 may be an upper guide member depending on a position relationship when being assembled in the lens implement 1. Also, if the lens implement 1 is rotated from the state shown in FIG. 1B, the two guide members 77 may be the left and the right members, or front and back members.

Furthermore, the pressing members, which press the neighborhoods of both of the ends of the lower guide member 77-2 in the direction of the upper guide member 77-1, are not limited to the spiral springs 83. Board springs, magnets, etc. may be available. Additionally, the lower guide member 77-2 is not limited to being pressed in the direction of the upper guide member 77-1 with the pressing force, and may be drawn in the direction of the upper guide member 77-1 with drawing force.

Next, drop preventing pins 84 are arranged by making the pins abut on both of the ends of the lower guide member 77-2 that is inserted into the shaft bearing long holes 81 in order to prevent the lower guide member 77-2, which can freely move up and down, from dropping or falling away. Both ends of the drop preventing pins 84 are adhered and secured to pin fixing grooves 85 formed on the outer surface of the shaft bearing long holes 81. The lower guide member 77-2 is prevented from dropping or falling away by the above described drop preventing pins 84, and its reaction move when the vibrator 70 makes a reverse move is restricted.

The above described vibrator 70 moves forward and backward between the erecting parts 78-2 at both of the ends in a direction in parallel with the guide members 77-1 and 77-2, which is indicated by a bidirectional arrow b shown in FIG. 4B, with a specific vibration to be described later, and the operations of the driving contacting parts 76 and the two guide members 77-1 and 77-2.

In the above described driving contacting parts 76, concave cut parts, which have various shapes, for being properly guided (or restricted) by the first and the second guide members 77 are provided on surfaces contacting the first and the second guide members 77. As a result, the move direction of the vibrator 70 is restricted to only a direction along the first or the second guide member 77 via the driving contacting parts 76, although details will be described later.

As described above, the guide members 77 forming the move path of the vibrator 70 restrict also the move direction of the vibrator 70 via the driving contacting parts 76. Additionally, since 3 or more driving contacting parts 76 are arranged, also the rotation of the vibrator 70 on a plane space formed by the first and the second guide members 76 and 77 is restricted. This eliminates the need for providing a rotation stopper of the vibrator 70, thereby simplifying the configuration.

In the vibration wave linear motor 46 which is shown in FIG. 4B and referred to in this embodiment, the vibrator 70 self-runs along the two guide members 77 as described above. However, for example, if a member sandwiching both of the ends of the vibrator 70 in the move direction is arranged and fixed to a frame, the supporting part 78 that supports the two guide members 77 is to move, and the vibrator 70 and the two guide members 77 have a relationship of a relative move. This will be described in detail later.

<Configuration of the Vibrator>

FIG. 5A is a front view of the vibrator 70 of the above described vibration wave linear motor 46. FIG. 5B shows its side view. FIG. 5C shows an arrangement of piezoelectric sheets and electrodes of the vibrator 70 shown in FIGS. 5A and 5B. FIGS. 5D and 5E are schematics exemplifying two other configurations of the vibrator. FIG. 5F is a schematic exemplifying another form of coupled driving contacting parts.

FIGS. 5A and 5B show the vibrator 70 by turning the vibrator 70 shown in FIGS. 4A and 4B upside down. FIGS. 4A and 4B also show electrodes, which are wired to the vibrator unit 75 and not shown in FIGS. 4A and 4B.

As shown in FIGS. 5A and 5B, the vibrator 70 comprises: the vibrator unit 75 configured by a piezoelectric sheet layer 87 composed of stacked piezoelectric sheets 86, and an elastic sheet layer 89 composed of elastic sheets 88 stacked below the piezoelectric sheet layer; and pluralities (a total of 4 units in this example) of driving contacting parts 76 respectively arranged on two opposed surfaces in the stacking direction of the piezoelectric sheets 86 of the vibrator unit 75.

The above described vibrator unit 75 is manufactured by annealing the stacked piezoelectric sheets 86 and elastic sheets 88, and by performing poling.

Insulation sheets 91 are respectively attached to the top surface of the piezoelectric sheet layer 87 and the bottom surface of the elastic sheet layer 89. As an insulation sheet 91, the same member as an elastic sheet 88, which is originally an insulation material, may be available.

The above described driving contacting parts 76 are respectively formed by being made to closely contact the outside surfaces of the insulation sheets 91. Additionally, the respective 2 driving contacting parts 76 are formed not alone but integrally with a flat board part 92 configured by a board member, so that the two driving contacting parts 76 form a coupled driving contacting part 93 (not the whole but the two driving contacting parts 76 form a contacting unit). Note that the coupled driving contacting part 93 is formed separately from the vibrator unit 75.

The driving contacting parts 76 are formed as a coupled driving contacting part 93 as described above, whereby the efficiency of assembly can be increased in comparison with a case where a plurality of driving contacting parts 76 are separately assembled. However, it is not always necessary to configure the driving contacting parts 76 as the coupled driving contacting parts 93 on both of the surfaces. Configuring only one coupled driving contacting part 93 with driving contacting parts on either of the surfaces can contribute to improvements in the efficiency of assembly.

Preferably, the coupled driving contacting part 93 is made of a resinous material obtained by scattering and solidifying abrasive grains such as alumina powder, etc. Since the acoustic impedance of this material is lower than those of the other portions of the vibrator 70, most members other than the coupled driving contacting part and close to a longitudinal vibration or a flexion vibration, which will be described later, are excited, leading to the facilitation of design.

Furthermore, a material having both hardness and elasticity is selected as the material of the coupled driving contacting part 93, whereby the part can be easily made to vibrate along with the vibrator unit 75, and its abrasion resistance is improved. This contributes to improvements in the durability of the vibration wave linear motor 46.

Additionally, preferably, the size of the flat board part 92 of the coupled driving contacting part 93 is formed to match the surface of the vibrator unit 75 (it is preferable that the surfaces of the coupled driving contacting part 93 and the vibrator unit 75, which are attached to each another, are identical in shape and size. Namely, it is preferable that the bottom surface of the coupled driving contacting part 93 is the same as that of the vibrator unit, to which the coupled driving contacting part 93 is to be attached).

In this way, alignment is facilitated when the coupled driving contacting part 93 is attached to the vibrator unit 75, thereby improving the efficiency of assembly operations. If only one end of the flat board part 92 (coupled driving contacting part 93) is aligned with one end of the surface of the vibrator unit 75 like the lower coupled driving contacting part 93 on the bottom surface shown in FIG. 5F, this can also achieve the same effect.

The piezoelectric sheet layer 87 of the vibrator unit 75 configures a piezoelectric unit for mainly giving a forcible vibration, whereas the elastic sheet layer 89 configures an exciting unit for exciting particular vibration mode along with the piezoelectric unit. However, if desired vibration mode can be excited only with the piezoelectric unit, the exciting unit is not always required.

The piezoelectric sheets 86 forming the piezoelectric sheet layer 87, and the elastic sheets 88 forming the elastic sheet layer 89 are originally, for example, thin rectangular sheet members made of the same material such as PZT (titanic acid lead zirconate), etc. except whether or not an internal electrode process shown in FIG. 5C is executed. Specifically, each of the sheets is, for example, 10 mm (length) by 2.5 mm (width) by 80 μm (height) (thickness in the stacking direction) in size.

As the PZT material used in this embodiment, a hard material having a Qm value as large as 2000 is selected and used. The same material is used also as an elastic sheet. Additionally, the insulation sheets 91 which sandwich the piezoelectric sheet layer 87 and the elastic sheet layer 89 are made of the same PZT material having a thickness of 40 μm. Although these insulation sheets are made of the same material as that of the piezoelectric sheets, electrodes are not provided thereon. Therefore, the insulation sheets are not polarized and have no piezoelectricity, and actually have a characteristic as an insulation material.

The piezoelectric sheets 86 of the piezoelectric sheet layer 87 are configured by two types of sheet-state piezoelectric elements only having different electrode patterns for which the internal electrode process is executed. One of the two types of the piezoelectric sheets 86 is a piezoelectric sheet 86m partitioned into right and left portions, in which A+ internal electrode foil 94 and B− internal electrode foil 95 are formed, on an entire surface as shown in FIG. 5C. For the A+ internal electrode foil 94 and the B− internal electrode foil 95, terminals 94-1 and 95-1, which are intended to make an external connection, are respectively formed to protrude toward one side of the piezoelectric sheet 86m in positions close to both of the right and left ends.

The other type is a piezoelectric sheet 86n similarly partitioned into right and left portions, in which A− internal electrode foil 96 and B+ internal electrode foil 97 are formed, almost on an entire surface. For the A− internal electrode foil 96 and the B+ internal electrode foil 97, terminals 96-1 and 97-1, which are intended to make an external connection, are formed to protrude toward one side, which is the same as the sheet 86m, of the piezoelectric sheet 86n in positions close to the center between the right and the left portions.

For the above described internal electrode foils, silver-palladium alloy or silver is used as their electrode material. The electrode foils are formed to have a thickness of 4 μm, for example, with vapor deposition and a photolithography technique.

In this preferred embodiment, the piezoelectric sheet layer 87 is configured by alternately stacking these two types of piezoelectric sheets 86m and 86n as a total of 48-sheet layers composed of respective 24 sheets.

In this way, in a middle portion except for the topmost and the bottommost portions, the internal electrodes for applying voltages having reverse potentials to both of a piezoelectric sheet 86 (86m or 86n), on which internal electrode foils are formed, and a piezoelectric sheet 86 (86n or 86m), which the internal electrode foils themselves contact.

The terminals 94-1, 95-1, 96-1, and 97-1, which are formed to protrude toward one side of the piezoelectric sheet 86 (86m, 86n) from the above described A+ internal electrode foil 94, A− internal electrode foil 97, B+ internal electrode foil 97, and B− internal electrode foil 95 and are intended to make an external connection, are respectively connected to an A+ electrode connecting external terminal 98, an A− electrode connecting external terminal 99, a B+ electrode connecting external terminal 101, and a B− electrode connecting external terminal 102, which are made of baked silver, on one side surface (one of two side surfaces that are parallel to the two guide members 77 shown in FIGS. 4A and 4B and do not face the guide members 77) of the vibrator unit 75 shown in FIG. 5A.

The A+ electrode connecting external terminal 98 and the A− electrode connecting external terminal 99 are configured as A phase electrodes, whereas the B+ electrode connecting external terminal 101 and the B− electrode connecting external terminal 102 are configured as B phase electrodes. In this case, the A− electrode connecting external terminal 99 and the B− electrode connecting external terminal 102 are configured for connecting to A phase and B phase grounds (GNDs). Therefore, these terminals may be configured to have the same electric potential by connecting to the same lead wire, etc. in this case.

A voltage is applied from a driving circuit to be described later to the piezoelectric sheet layer 87 via these A phase and B phase electrode connecting external terminals, so that the vibrator unit 75 generates ultrasonic elliptical vibrations to be described later.

The vibrator unit 75 in this preferred embodiment is configured, for example, to be 10 mm (length) by 2 mm (width) by 2.5 mm (height) in size. In this vibrator unit 75, a pin member installment hole 103, which is not shown in FIGS. 4A and 4B, is formed almost in the middle of the A phase and the B phase electrodes, namely, almost in a central part of the vibrator unit 75. The pin member installment hole 103 will be described later.

Additionally, the piezoelectric unit is not limited to the piezoelectric sheet layer 87. For example, the following configuration may be available. FIG. 5D shows the configuration as a piezoelectric unit, where coupled driving contacting parts 93 are attached to a vibrator unit, which is obtained by adhering and linking piezoelectric units 105 composed of stacked layer piezoelectric units or piezoelectric elements, a vibrator unit principal part 106 made of, for example, brass, and vibrator unit components 107. The vibrator unit principal part 106 and the vibrator unit components 107 configure an exciting unit.

FIG. 5E shows a configuration where thin single board piezoelectric units 109 and coupled driving contacting parts 93 are attached to a rectangular-parallelepiped-shaped elastic part 108 made of, for example, brass. The elastic part 108 configures an exciting unit. Attaching these parts by applying sufficient pressure when the parts are attached is vital to increase vibration transmission efficiency.

<Principle of Driving>

FIG. 6 shows a driving circuit driving and controlling a vibration wave linear motor 46 having the above described configuration. The driving circuit 110 shown in this figure is mounted along with an AF (Auto Focus) circuit 109 on the circuit board 2 shown in FIG. 1A.

Upon receipt of any of forward and backward instruction signals along with any of move and stop instruction signals from the AF circuit 109, a CPU (Central Processing Unit) 111 of the driving circuit 110 outputs a corresponding signal to an oscillation circuit 112 and a 90° phase circuit 113.

Upon receipt of the move signal, the oscillation circuit 112 applies an ultrasonic driving voltage to the A phase electrodes 98 and 99 of the vibration wave linear motor 46 via an amplifier 114-1, and outputs the same ultrasonic driving voltage to the 90° phase circuit 113.

The 90° phase circuit 113 shifts the phase of the frequency of the ultrasonic driving voltage input from the oscillation circuit 112 by +90° or −90° based on the forward or backward instruction signal received along with the move signal from the CPU 111, and applies the voltage to the B phase electrodes 101 and 102 of the vibration wave linear motor 46 via another amplifier 114-2.

As a result, the vibration wave linear motor 46 self-runs in a predetermined direction as will be described later by making an ultrasonic vibration, and moves the third movable lens frame 19 in a predetermined direction along with the optical axis O2.

As described above, the absolute position of the third movable lens frame 19 is detected in advance by the reflector (light reflecting member 62) and the photosensor 73 of a reflection type. The detected absolute position is notified to the CPU 111.

In the meantime, the move amount of the third movable lens frame 19 is detected in a way such that the magnetic sensor reads the magnetic scale of the magnetic sensor unit 47. A pulse signal, which indicates the move amount read by the magnetic sensor, is output to a counter 115 via an amplifier 114-3. The counter 115 measures the pulse signal indicating the move amount, and outputs a measurement result to the CPU 111.

The CPU 111 recognizes the current position of the third movable lens frame 19 based on the absolute position of the third movable lens frame 19, which is input from the photosensor 73, and the measurement result of the move amount, which is input from the counter 115, and notifies the AF circuit 109 of the recognized current position of the third movable lens frame 19. The CPU 111 stops the output of the oscillation circuit according to the stop signal from the AF circuit 109.

Figure 7A:
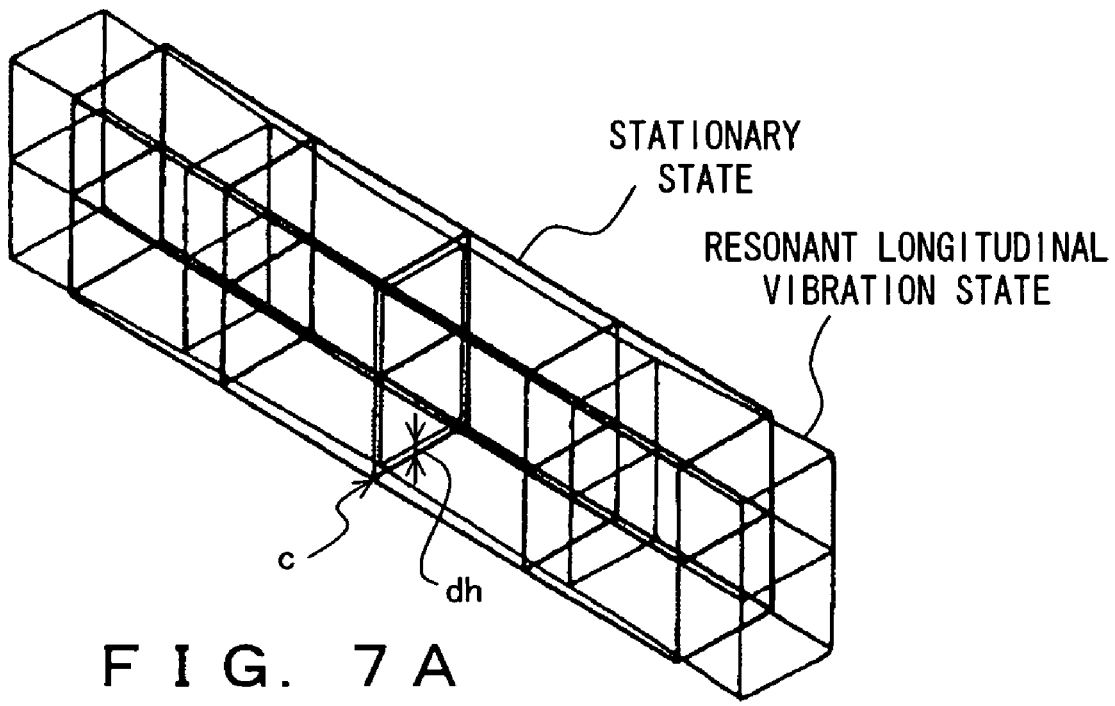
FIGS. 7A and 7B are perspective views schematically explaining ultrasonic elliptical vibrations of the vibrator unit of the vibration wave linear motor.
Figure 7B:
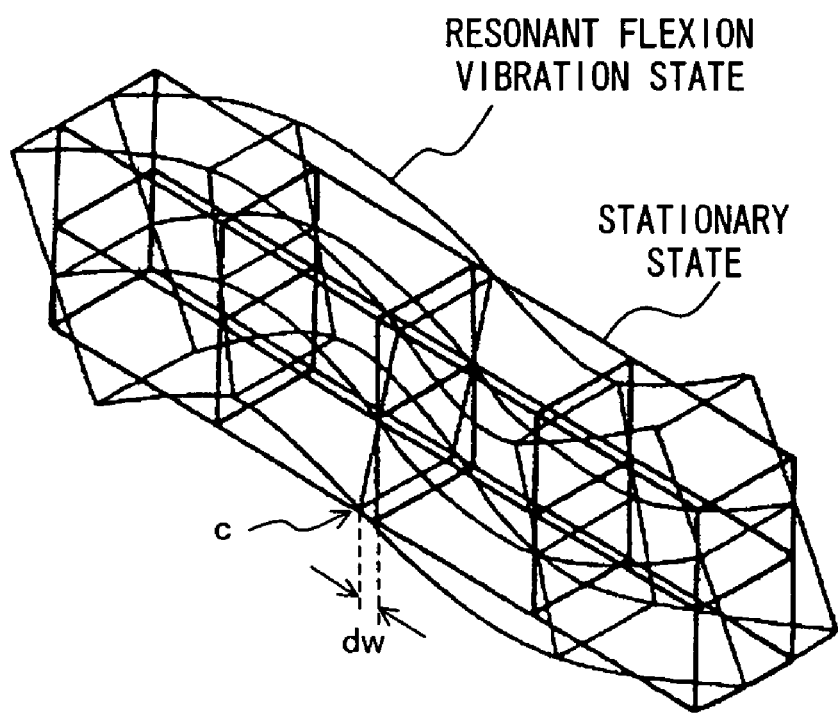

FIGS. 7A and 7B are perspective views schematically explaining ultrasonic elliptical vibrations of the vibrator unit 75 of the vibration wave linear motor 46 that is oscillated and driven as described above.

Firstly, if an alternating current voltage having the same phase in the neighborhood of a frequency 160 kHz is applied to the A phase electrodes 98 and 99 and the B phase electrodes 101 and 102 of the vibrator unit 75 shown in FIG. 5A, a primary longitudinal vibration is excited in the vibrator unit 75. Also, if an alternating current voltage having a reverse phase in the neighborhood of the frequency 160 kHz is applied to the A phase electrodes 98 and 99 and the B phase electrodes 101 and 102, a secondary flexion vibration is excited in the vibrator unit 75.

These vibrations were analyzed with a finite element method by using a computer, so that a resonant longitudinal vibration posture shown in FIG. 7A, and a resonant flexion vibration posture shown in FIG. 7 were respectively expected. Results of the supersonic vibration measurement proved these expectations.

In this preferred embodiment, the resonant frequency of the secondary flexion vibration is designed to be lower than that of the primary longitudinal vibration by several percent (preferably 3 percent or so). With such a configuration, the output characteristic as the vibration wave linear motor can be significantly improved as will be described later.

Next, by applying an alternating current voltage having a phase different by $\pi/2$ in the neighborhood of 160 kHz to the A phase electrodes 98 and 99 and the B phase electrodes 101 and 102 of the vibrator unit 75, an elliptical vibration can be observed in the positions of the driving contacting parts 76 of the vibrator 70.

In this case, the direction of the rotation of the elliptical vibration caused by the supersonic vibration in the positions of the driving contacting parts 76 arranged on the bottom surface of the vibrator 70, and that of the rotation of the elliptical vibration caused by the supersonic vibration in the positions of the driving contacting parts 76 arranged on the top surface become reverse.

Additionally, if the resonant longitudinal vibration and the resonant flexion vibration, which are respectively shown in FIGS. 7A and 7B, are further analyzed, in the resonant longitudinal vibration, an expansion and contraction vibration caused by a repetition of contraction and expansion respectively appear in the vertical and horizontal directions in the short side direction in correspondence with an expansion and contraction vibration of the vibrator unit in the long side direction shown in FIG. 7A. This phenomenon becomes more conspicuous toward the middle portion c of the vibrator unit. For the sake of explanation, if the expansion and contraction vibration caused by the contraction and expansion of the vibrator unit only in the vertical direction in the short side direction is represented, the vibration is made in a range of an expansion and contraction width dh shown in FIG. 7A.

In the resonant flexion vibration, a vibration like a pendulum appears in a range of a width dw in the long side direction of the vibrator unit in the middle portion c of the vibrator unit in correspondence with the flexion vibration in the vertical direction in the short hand direction of the vibrator unit, which is shown in FIG. 7B.

The vibration in the expansion and contraction width dh in the vertical direction, and the vibration like a pendulum in the width dw in the long side direction cause an elliptical vibration also in the middle portion c. A cycle of the elliptical vibration in the middle portion c has a shift of approximately 90° from the cycle of the elliptical vibration of the above described driving contacting part 76 (see FIG. 5) at the end in the long side direction or closer to the middle portion.

FIGS. 8A to 8F schematically show the elliptical vibrations of the driving contacting parts of the vibrator when alternating current voltages having different phases are respectively applied. In FIGS. 8A to 8F, the starting and end points of a circular arrow indicated for a driving contacting part 76 respectively indicate the starting and end points of the cycle of the elliptical vibration of the driving contacting part 76, which corresponds to the starting and end point of the phase of an applied voltage.

Figure 8A:
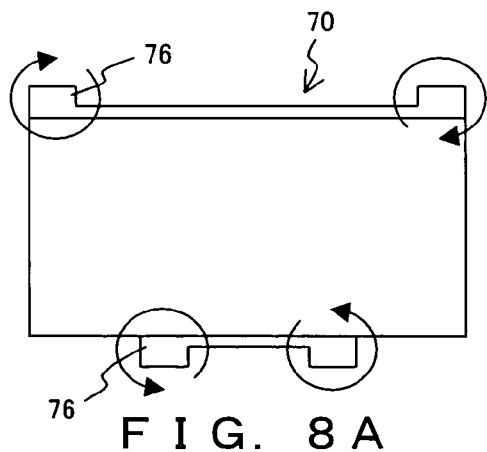
FIGS. 8A to 8F are schematics showing the elliptical vibrations of the driving contacting parts of the vibrator when alternating current voltages having different phases are respectively applied.
Figure 8C:
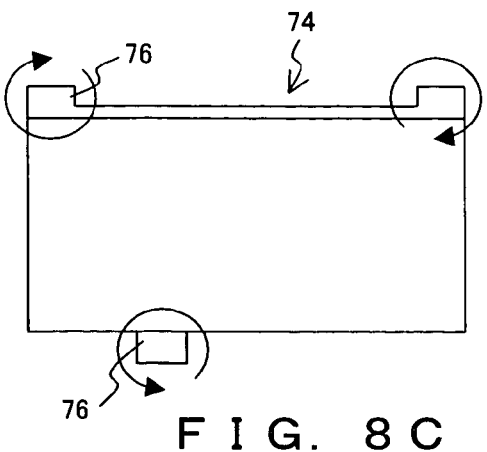
Figure 8B:
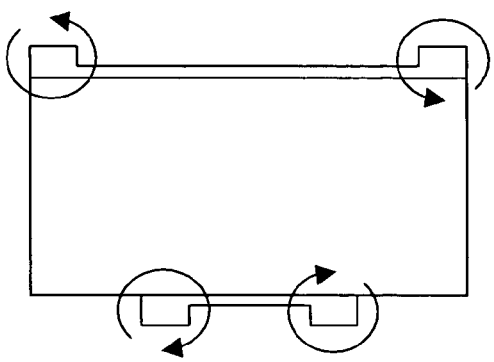

FIGS. 8A and 8B schematically show the elliptical vibrations of the driving contacting parts of the vibrator 70 when an alternating current voltage having a phase different by $\pi/2$ in the neighborhood of 160 kHz is applied. FIG. 8A shows operations performed when the phase of the alternating current voltage, which is applied to the A phase electrodes 98 and 99 shown in FIG. 5A, is behind by $\pi/2$ from the phase of the alternating current voltage, which is applied to the B phase electrodes 101 and 102. In this figure, the driving contacting parts 76 on the bottom surface of the vibrator 70 rotate in a counterclockwise direction, whereas the driving contacting parts 76 on the top surface rotate in a clockwise direction.

As described above, the driving contacting parts 76 on the top and the bottom surfaces are respectively arranged in positions where the elliptical vibrations in different directions appear, whereby driving force in the same direction occurs in the vibrator 70.

FIG. 8B shows operations performed when the phase of the alternating current, which is applied to the A phase electrodes 98 and 99, is ahead by $\pi/2$ from the phase of the alternating current voltage applied to the B phase electrodes 101 and 102. In this figure, the driving contacting parts 76 on the bottom surface of the vibrator 70 rotate in the clockwise direction, whereas the driving contacting parts on the top surface rotate in the counterclockwise direction. The direction of the driving force occurring in the vibrator 70 in this case becomes reverse to that in the case shown in FIG. 8A.

Figure 8D:
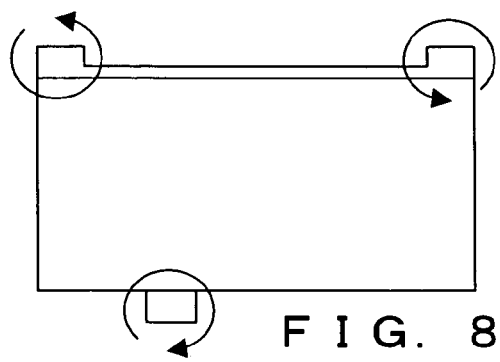

FIGS. 8C and 8D respectively show an arrangement example of 3 driving contacting parts 76 in the vibrator configured to comprise 3 driving contacting parts. In these examples, only one driving contacting part 76 is left on the bottom surface by removing the driving contacting part 76 on the right side of the lower coupled driving contacting part shown in FIGS. 8A and 8B.

An internal configuration of the vibrator 74 shown in FIGS. 8C, 8D, 8E, and 8F is the same as that of the vibrator 70 exemplified in FIGS. 5A to 5F.

Also in the cases shown in FIGS. 8C and 8D, the upper left driving contacting part 76 makes an elliptical vibration, which rotates in the same cycle in the same direction and whose phase is behind/ahead by π/2 from the phase of the elliptical vibration of the upper right driving contacting part 76. The upper left driving contacting part 76 and the one lower left driving contacting part 76 respectively make elliptical vibrations that rotate in the same cycle and in reverse directions. As a result, driving force caused by the 3 driving contacting parts 76 in the same direction occurs in the vibrator 74 also in this case.

Figure 8E:
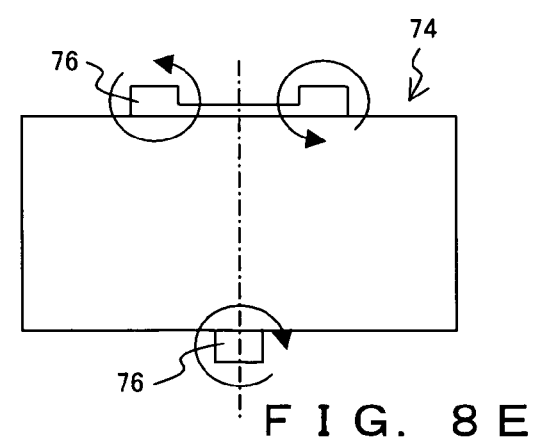
Figure 8F:
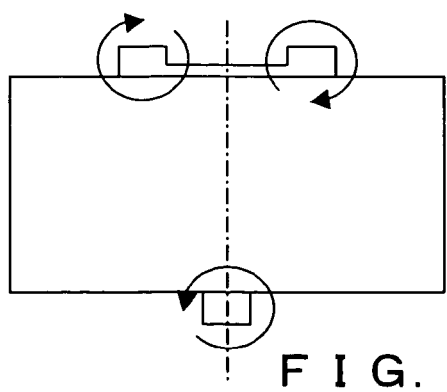

FIGS. 8E and 8F show other arrangement examples of the 3 driving contacting parts 76 in the vibrator 74 configured to comprise the 3 driving contacting parts in a similar manner as in the above described cases. In these cases, the vibrator 70 shown in FIGS. 8A and 8B is turned upside down, and only one driving contacting part 76 is provided in the middle as a replacement for the lower coupled driving contacting part having a wide interval.

In these cases, if the phase of an alternating current voltage to be applied to the vibrator 74 is behind or ahead by π/4 and applied, suitable driving force can be generated by the 3 driving contacting parts 76.

As described above, the elliptical vibrations obtained by synthesizing the longitudinal vibration and the flexion vibration of the vibrator 75, which are shown in FIGS. 7A and 7B, act on the two guide members 77 shown in FIGS. 4A and 4B via the 4 or the 3 driving contacting parts 76, and the vibrator unit 75 moves forward and backward along the two guide members 77 between both of the erecting parts 78-2 of the supporting part 78 as a counteraction. This is the operational principle of the vibration wave linear motor according to the present invention.

In this preferred embodiment, the piezoelectric unit is configured by two portions such as the A phase where the A phase electrodes 98 and 99 are arranged, and the B phase where the B phase electrodes 101 and 102 are arranged. However, the piezoelectric unit is not limited to 2.3 or more portions may be used as far as they can generate the longitudinal vibration and the flexion vibration.

Additionally, the vibrator 70 (or 74) is shaped almost like a rectangular parallelepiped. In such a case, the above described driving force is obtained with the longitudinal and the flexion vibrations. However, the vibrator may have another shape. Besides, similar vibrations can be obtained also by simultaneously exciting one or a plurality of modes of frequencies that are identical or of an integral multiple.

Furthermore, it is preferable that the driving contacting parts are arranged in arbitrary positions where the output characteristic of the highest level can be obtained as the vibration wave linear motor, namely, positions where ultrasonic elliptical vibrations of the highest level of the vibrator 70 are made. Normally, however, since making an elliptical vibration becomes the source of driving, an elliptical vibration occurs in at least one or more driving contacting parts. Therefore, the driving contacting parts may be arranged so that the total sum of driving force caused by a vibration that occurs in the positions of all of the driving contacting parts does not become zero.

Furthermore, it is unnecessary that an elliptical vibration occurs in positions of all of driving contacting parts. Even if a single vibration or a vibration in a reverse direction occurs, it does not matter as far as the total sum of driving force from the driving contacting parts becomes not zero but driving force in one direction.

<Configuration of a Linked Part>

A configuration where forward and backward moving force of the vibrator 70, which is caused by the above described elliptical vibrations, along the two guide members 77 within the vibration wave linear motor 46, is taken out as the move driving force of the third movable lens frame 19 is described next.

Figures 9A, 9B, 9C:
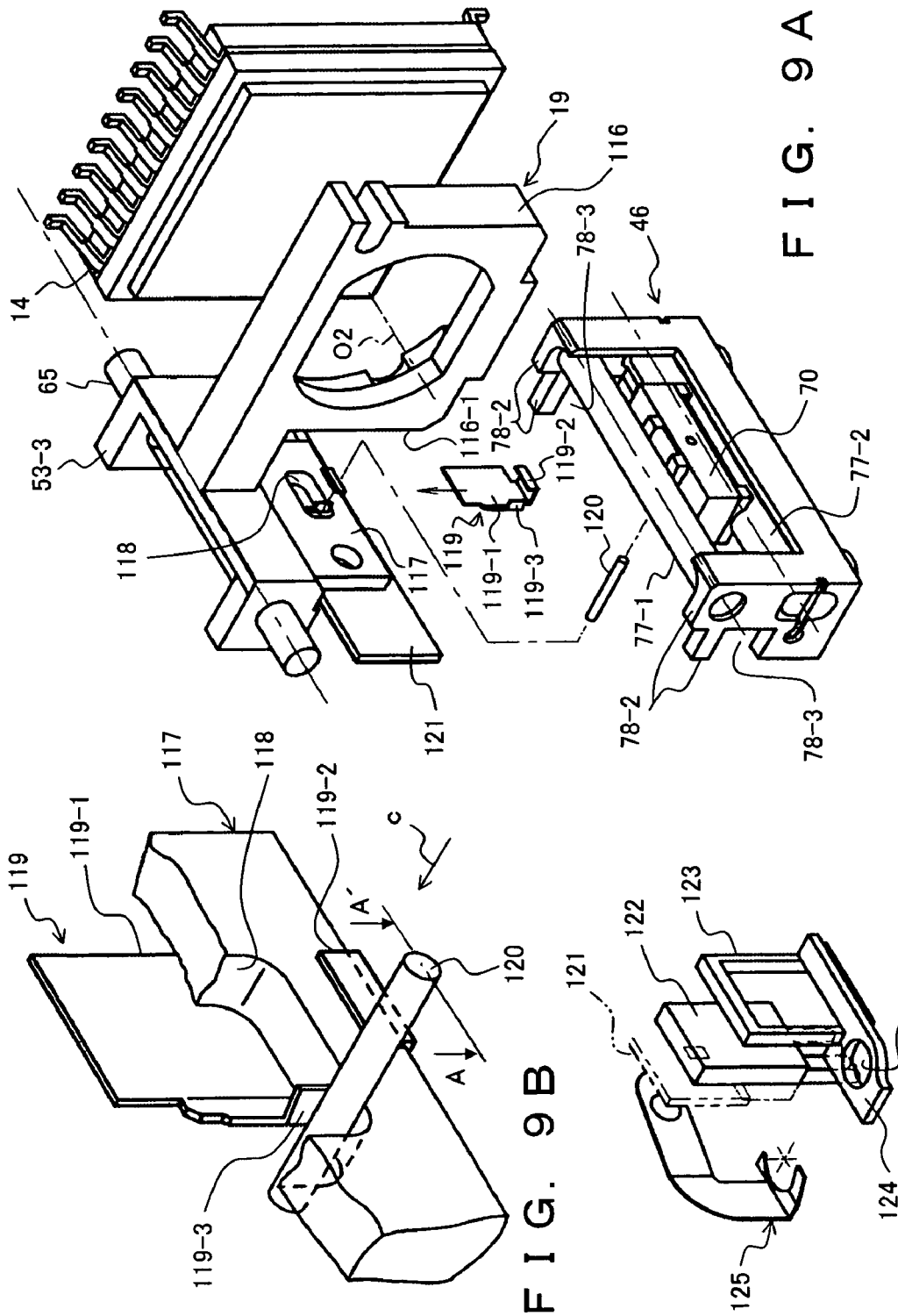
FIG. 9A is a perspective view explaining a method linking the vibration wave linear motor and a third movable lens frame.
FIG. 9B is an enlarged perspective view showing only the linked portion.
FIG. 9C is an enlarged view showing a magnetic sensor unit detecting the move amount of the third movable lens frame.

FIG. 9A is a perspective view explaining a method linking the above described vibration wave linear motor 46 and the third movable lens frame 19. FIG. 9B is an enlarged perspective view showing only the linked part. FIG. 9C is an enlarged view showing the magnetic sensor unit detecting the move amount of the third movable lens frame 19.

Figure 10A:
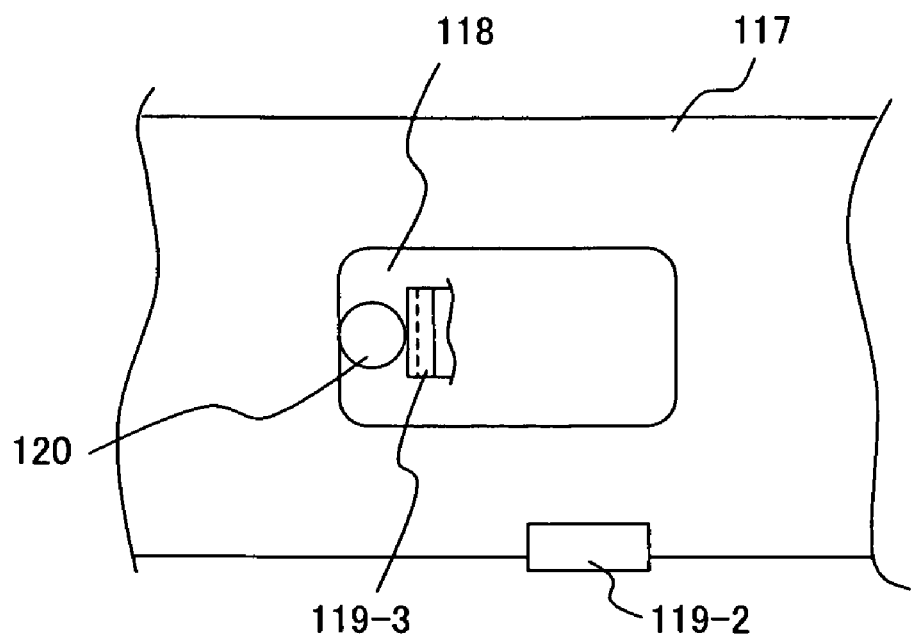
FIG. 10A is a schematic showing FIG. 9B when viewed in the direction of an arrow c.
Figure 10B:
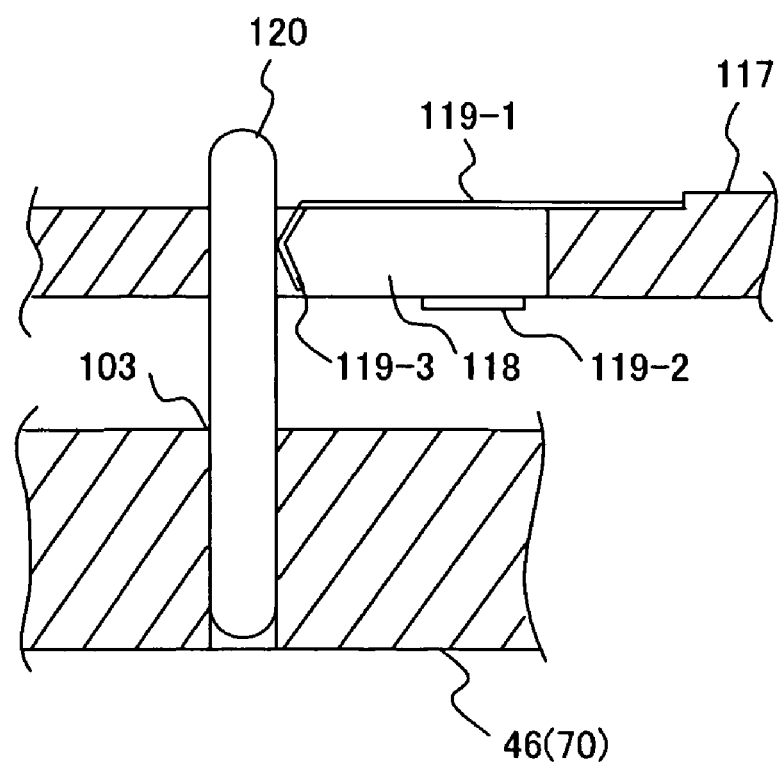
FIG. 10B is a cross-sectional view of FIG. 9B when taken along an arrow line A–A'.

FIG. 10A is a schematic showing FIG. 9B when viewed in a direction of an arrow c. FIG. 10B is across-sectional view of FIG. 9B when taken along an arrow line A–A'.

FIG. 9A is a schematic showing the vibration wave linear motor 46 and the third movable lens frame 19 in FIG. 3. Additionally, this figure shows a pin member 120 for taking out a move output, which is fixed by being inserted into the inside from the pin member installment hole 103 shown in FIGS. 5A, and 5D to 5F in the center on the surface, where the pin is fixed, at an obliquely upper left on the other side of the vibrator 70, and is pulled out on the side, where the pin is fixed, for ease of understanding.

As shown in FIG. 9A, the third movable lens frame 19 is configured by the lens frame main unit 116 holding the third movable lens unit 12, a shaft bearing part 53-3, and an engaging protruding part 117 provided to protrude downward from the shaft bearing part 53-3. A long hole 118, which extends in a direction parallel with the direction where the lens frame main unit 116 moves along the optical axis O2, is provided almost in a central portion of the engaging protruding part 117.

In the long hole 118 (see also FIGS. 10A and 10B), a board spring 119, which presses the portion (the long hole 118 of the engaging protruding part 117) where the pin member 120 for taking out a move output abuts on the third movable lens frame 19, is engaged from the far side in this figure.

The board spring 119 is configured by a flat main part 119-1, an engaging part 119-2 bent in two stages toward the front and then upward from the bottom of the main part 119-1, and a pressing part 119-3 bent toward the front from the left end of the main part 119-1.

For this board spring 119, its engaging part 119-2 engages with the engaging protruding part 117 by wrapping the bottom of the engaging protruding part 117, where the long hole 118 of the third movable lens frame 19 is formed, from the far side. As a result, the main part 119-1 of the board spring 119 closely contacts with the long hole 118 on the far side, and the pressing part 119-3 is inserted in a predetermined position within the long hole 118 from the far side.

Between the pressing part 119-3 and the left end of the long hole 118, a gap in which the pin member 120 for taking out a move output is inserted is formed.

Between a side surface 116-1 on the opposite side of the lens frame main unit 116 of the third movable lens frame 19 and a surface on the near side of the engaging protruding part 117, a clearance for arranging the vibrator 70 of the vibration wave linear motor 46, and the flexible board that is connected to the A+ electrode connecting external terminal 98, the A− electrode connecting external terminal 99, the B+ electrode connecting external terminal 101, and the B− electrode connecting external terminal 102 of the vibrator 70, which are shown in FIG. 5 is formed.

When the vibration wave linear motor 46 is arranged in this clearance, the pin member 120 for taking out a move output is inserted in the gap formed between the pressing part 119-3 and the left end of the long hole 118 as shown in FIG. 9B.

With this engagement, the movements of the pin member 120 for taking out a move output in the direction of the second optical axis O2 are prohibited within the long hole 118, and the pin member 120 faithfully transmits the move of the vibrator 70 of the vibration wave linear motor 46, which is arranged by being fixed to the metal frame 23a not shown in FIG. 9A, in the direction of the optical axis O2 to the third movable lens frame 19.

Additionally, for the pin member 120, a play is allowed in its upward and downward movements in the above described engagement. This play absorbs a positional deviation, etc. when the vibrator 70 and the two guide members 77 (77-1, 77-2) are installed.

Furthermore, the pin member 120 for taking out a move output accurately transmits the direction and the force of the move of the vibrator 70 in the direction of the second optical axis O2 to the third movable lens frame 19 as described above. In the meantime, the pin member 115 absorbs the upward and downward movements of the vibrator 70, which are caused by the elliptical vibration of the vibrator 70, etc., with the upward and downward movements within the long hole 118, and does not transmit to the third movable lens frame 19.

As described above, as the linkage between the vibrator 70 and the third movable lens frame 19, a linked state implemented with the pin member 120 for taking out a move output, which is fixed to the vibrator 70 and only abuts on the portion (the long hole 118 of the engaging protruding part 117) of the third movable lens frame 19 with the pressing force of the board spring 119, is formed. As a result, the moving force (driving force) of the vibrator 70 is transmitted to the move of the third movable lens frame 19.

As described above, the pin member 120 is a move driving transmitting means for transmitting the move driving force of the vibrator 70 to an outside (a move driving mechanism within an electronic appliance, a member to be driven to move within a device) when the vibration wave linear motor 46 is comprised in the electronic appliance, device, etc.

Additionally, in this preferred embodiment, the pin member 120 for externally taking out the moving force of the vibrator 70 (driving force of the driving contacting parts 76) is arranged by being fixed to the central part of the vibrator 70, namely, a section common to the primary longitudinal vibration and the secondary flexion vibration (neighborhood of a stationary point in each of the vibration modes). Even if another vibration mode or a synthesis of vibration modes is used as the vibration mode of the vibrator, the pin member 120 is arranged in a section common to the vibration modes, or a portion where the vibration becomes minimal, whereby the moving force of the vibrator can be transmitted to a member to be moved without impeding the vibration of the vibrator.

In the meantime, in the vibration wave linear motor 46 in this preferred embodiment shown in FIG. 4B, the vibrator 70 and the two guide members 77 were described to have a relationship of a relative move. If this relative move is described with reference to FIG. 9, the vibrator 70 which self-runs with reference to the fixed supporting part 78 moves the third movable lens frame 19 linked to the vibrator 70 in the case of FIG. 9. Assume a configuration where both of the ends of the vibrator 70 in the move direction are sandwiched by an elastic member which does not prevent the vibration of the vibrator 70, this elastic member is fixed to the metal frame 23a, and a supporting part supporting the two guide members 77 is formed in a suitable position of the third movable lens frame 19.

With such a configuration, the vibrator 70 is arranged by being fixed, and the two guide members 77 which are driven by the driving contacting parts 76 of the vibrator 70 are moved. Namely, the third movable lens frame 19 linked to the two guide members 77 moves.

Such a configuration can be also implemented. Accordingly, the description that the vibrator 70 and the two guide members 77 have a relationship of a relative move was provided. However, the following description sometimes states that the vibrator 70 self-runs along/with reference to the two guide members 77 based on the configuration shown in FIG. 9.

<Detection of a Move Amount>

In the linked configuration shown in FIG. 9 (9A and 9B), one end, which is not shown by being hidden, of the magnetic scale 121 of the magnetic sensor unit 47 is arranged by being fixed to the engaging protruding part 117 on the far side of FIG. 9 (9A and 9B), and the magnetic sensor 122 of the magnetic sensor unit 47 is arranged by being fixed to the metal frame 23a, which is not shown in FIG. 9A, in a position as opposed to the other end, which is shown, of the magnetic scale 121.

The magnetic sensor 122 is arranged by being fixed to the metal frame 23a in a way such that the magnetic sensor 122 is fit into the sensor holding frame 123, and a fixing board 124 fixing the sensor holding frame 123 is fixed to the metal frame 23a with a fixing hole 124-1. Additionally, a board spring member 125 pressing the magnetic scale 121 in the direction of the magnetic sensor 122 is simultaneously arranged by being fixed. Additionally, a board spring member 125, which presses the magnetic scale 121 in the direction of the magnetic sensor 122, is simultaneously arranged by being fixed.

Figure 11:
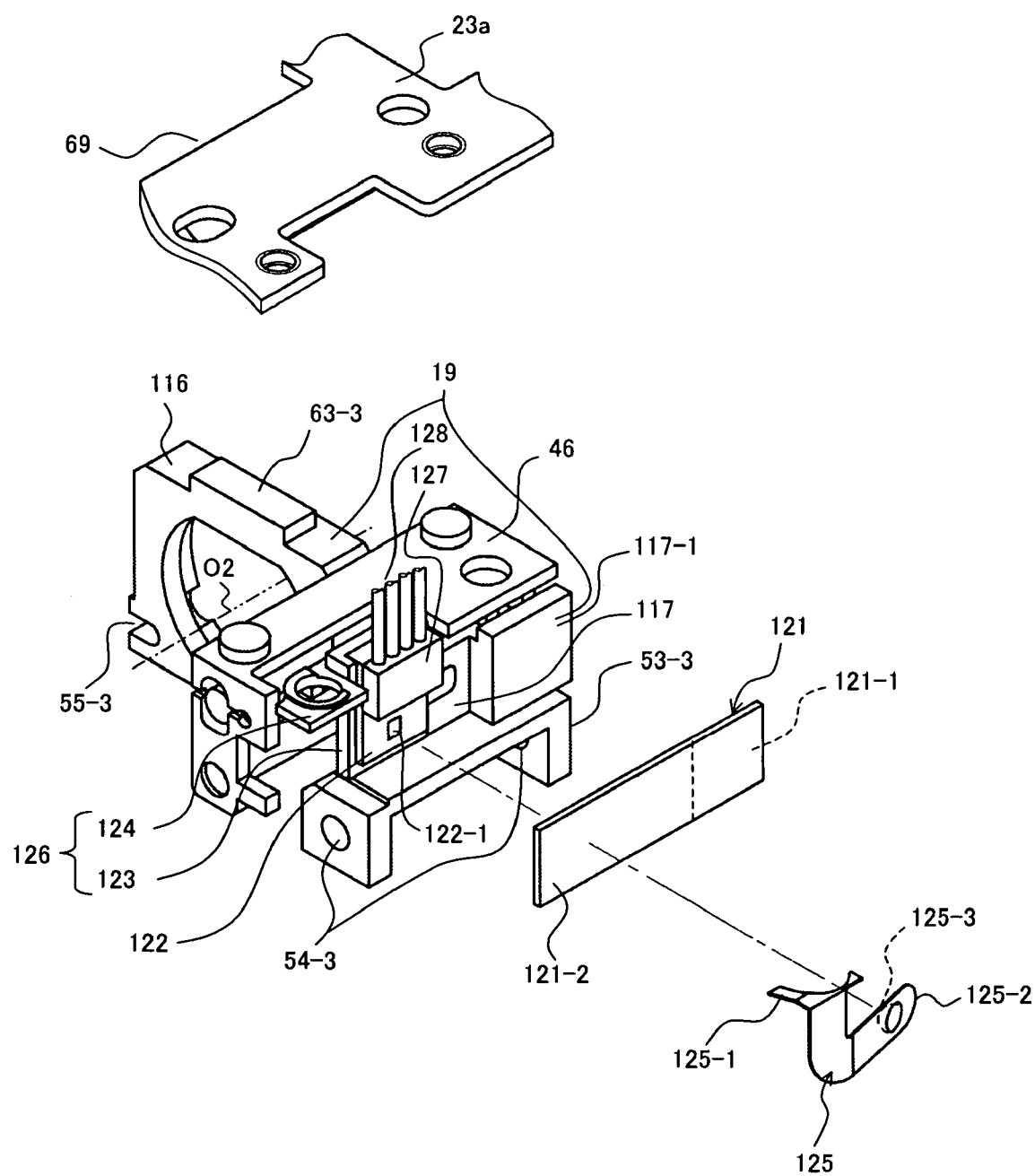
FIG. 11 is a partial disassembly perspective view showing the detailed configuration of the magnetic sensor unit along with the vibration wave linear motor where the magnetic sensor unit is assembled, and the third movable lens frame.

FIG. 11 is a perspective view showing a partial disassembly of the detailed configuration of the magnetic sensor unit 47 shown in FIGS. 2 and 3 along with the vibration wave linear motor 46 in which the magnetic sensor unit 47 is assembled, and the third movable lens frame 19.

The magnetic sensor unit 47 is arranged to detect the move distance of the third movable lens frame 19 from an absolute position after the photosensor 73 shown in FIG. 2 detects the absolute position of the third movable lens frame 19.

As shown in FIG. 11, the above described vibration wave linear motor 46 is arranged between the side surface (the side surface opposite to the side surface on which the U-shaped cut part 55-3 exists) of the lens frame main unit 116 of the third movable lens frame 19 and the engaging protruding part 117 as described with reference to FIG. 9. This vibration wave linear motor 46 is fixed to the metal frame 23a along with the magnetic sensor holder 126 (the sensor holding frame 123 and the fixing board 124).

The fixing board 124 of the magnetic sensor holder 126 is configured to engage with an engaging part 125-1 of the board spring 125, and the sensor holding frame 123 of the magnetic sensor holder 126 holds the magnetic sensor 122.

A detecting unit 122-1 for detecting magnetism is formed almost in the central part of the magnetic sensor 122. Additionally, 4 electrode lead wires 128 whose electric connections to the magnetic sensor 122 are reinforced with an adhesive 127 are drawn from the top of the detecting unit 122-1.

Additionally, an engaging part 121-1 of the magnetic scale 121 is attached to a scale holding part 117-1 which forms a flat part by extending outside (obliquely lower right direction in FIG. 11) with a predetermined step height from the engaging protruding part 117 which erects (which erects under the shaft bearing part 53-5 because it is viewed upside down in FIGS. 3 and 9A to 9C) above the shaft bearing part 53-5 of the third movable lens frame. With this configuration, the magnetic scale 121 is fixed to the scale holding part 117-1 by orientating its scale surface toward the detecting unit 122-1 of the magnetic sensor 122.

This magnetic scale 121 is installed by being fixed to the third movable lens frame 19 via the scale holding part 117-1, whereas the magnetic sensor 122 is fixed to the metal frame 23a. Additionally, the third movable lens frame 19 is arranged to be movable along the two guide members (65, 68) against the metal frame 23a as described above, whereby also the magnetic sensor 122 and the magnetic scale 121 are arranged to be relatively movable.

This magnetic scale 121 is made of an elastic sheet material, for example, a resinous sheet such as polyester, etc., and obtained by coating a magnetic material on the scale surface side, and by magnetizing the magnetic material at predetermined intervals. To make the magnetic sensor 122 read the magnetism, it is preferable that the scale surface of the magnetic scale 121 and the detecting unit 122-1 of the magnetic sensor 122 are as close as possible at all times.

Accordingly, aboard spring 125 is provided. Namely, the board spring 125 comprises a spring part 125-2 which extends downward from an engaging part 125-1 and further extends horizontally in the form of a hook. At the end of the spring part 125-2, a dome-shaped convex part 125-3 which is provided to protrude toward the side of the magnetic scale 121 is formed. This convex part 125-3 is formed in a position corresponding to the detecting unit 122-1 of the magnetic sensor 122.

The engaging part 125-1 of the board spring 125 is fixed to the metal frame 23a along with the fixing board 124 of the magnetic sensor holder 126, whereby the convex part 125-3 of the board spring 125 presses a portion, namely, a free end side 121-2, which is not fixed to the engaging part 117-1 of the magnetic scale 121, against the detecting unit 122-1 of the magnetic sensor 122.

As a result, the scale surface of the magnetic scale 121 makes a relative move while sliding and contacting the detecting unit 122-1 of the magnetic sensor 122. The scale surface of the magnetic scale 121 slides and contacts the detecting unit 122-1 of the magnetic sensor 122 in this way, whereby the magnetic sensor 122 can properly read the scale of the magnetic scale 121.

As described above, the portion of the board spring 125, which presses the back side of the scale surface of the magnetic scale 121, is formed by the dome-shaped convex part 125-3. Therefore, frictional resistance with the magnetic scale 121 is extremely small, thereby reducing resistance load generated by the pressing.

Additionally, it is preferable to paste non-magnetic metal foil having a smooth surface, or to form a smooth resinous layer on the back side of the magnetic scale 121. This can suppress the abrasion caused by the friction with the board spring 125 to be low, and the lifetime of the apparatus can be maintained for a long time.

<Flexible Board>

A flexible board arranged between the external electrodes of the vibrator 70 of the vibration wave linear motor 46 and the driving circuit 110 is described next.

FIGS. 12A and 12B are perspective views respectively showing the above described vibration wave linear motor 46, and the flexible board arranged between the external electrodes of the vibrator 70 of the vibration wave linear motor 46 and the driving circuit 110.

As described above (see FIG. 5A), the 4 electrode connecting external terminals (A+ electrode connecting external terminal 98, the A− electrode connecting external terminal 99, the B+ electrode connecting external terminal 101, and the B− electrode connecting external terminal 102) of the A phase and the B phase, which are arranged in the vibrator 70 and made of baked silver, are connected to the terminals for an external connection within the respective electrode foils, on the side of the vibrator, where these terminals are provided to protrude.

Namely, the above described 4 A phase and B phase electrode connecting external terminals are arranged on one side of the two side surfaces (where the guide members 77 are not arranged) which do not face the guide members 77 in the direction (namely, the self-running direction of the vibrator 70) of the two guide members 77 of the vibrator 75. An electrode connecting part 130-1 of the flexible board 130 is arranged by being electrically connected to the 4 electrode connecting external terminals arranged only on one side surface.

For the flexible board 130, firstly as shown in FIG. 12A, a wiring part 130-2 is separated into two portions in the forward and backward directions of the self-running direction of the vibrator 70 from an end (the electrode connecting part 130-1) connected to the electrodes (the 4 A phase and B phase electrode connecting external terminals) to the driving circuit 110. Additionally, wiring parts 130-2, which are separated as two branches, are formed to be identical in width.

In this vibration wave linear motor 46, both of the ends of the two guide members 77 (77-1, 77-2) are respectively held by the erecting parts 78-2 existing at both of the ends of the supporting part 78. However, the wiring parts 130-2, which are separated as two branches, of the flexible board 130 are curved toward the central portion in the neighborhoods of both of the ends of the supporting part 78, namely, the two erecting parts 78-2, and merge in the central portion.

Additionally, at one end (both of the ends in this example) of at least one of the two erecting parts 78-2, which are the ends of the supporting part 78, an open part 78-3, which allows the curving wiring parts 130-2 of the flexible board 130 to enter and exit when the parts curve and move with the self-running of the vibrator 70, are provided.

Furthermore, in the vibrator unit 75 of the vibration wave linear motor 46, the pin member installment hole 103 is formed in a position in the neighborhood of the above described A phase and B phase electrodes as shown in FIG. 5A. With the pin member installment hole 103, the pin member 120 for linking to the engaging protruding part 117 of the third movable lens frame 19 is provided to protrude in a direction orthogonal to the self-running direction of the vibrator 70 as shown in FIGS. 9A, 9B, 10A, and 10B. The above described flexible board 130 comprises an unimpeding hole 130-3, which does not impede the protrusion of the pin member 120, in the electrode connecting part 130-1.

As described above, for the flexible board 130 in this preferred embodiment, the electrode connecting external terminals to be connected of the vibration unit 75 are arranged on only one of the two side surfaces of the vibrator unit 75, whereby the wiring of the flexible board 130 to the driving circuit 110 can be concentrated in one portion. As a result, a reduction in the size of the entire implement can be promoted.

Additionally, the open parts 78-3 in/from which the curving wiring parts 130-2 of the flexible board 130 can enter/exit, are provided in the erecting parts 78-2 of the supporting part 78. Therefore, the space where the flexible board 130 is accommodated when the curving wiring parts 78-3 curve and move with the self-running of the vibrator 70 is enlarged, whereby the load of curving fluctuations of the curving wiring parts 130-2 of the flexible board 130 with the self-running of the vibrator 70 is reduced, leading to the facilitation of the self-running of the vibrator 70.

Furthermore, the preventing hole 130-3, which does not impede the protrusion of the pin member 120, is comprised, in the electrode connecting part 130-1 of the flexible board 130, whereby the flexible board 130 can be arranged between the third movable lens frame linked by the pin member 120 and the vibrator 70, and a size reduction in a main body apparatus such as the lens implement 1, etc., in which the vibration wave linear motor 46 is embedded, is promoted.

Still further, if the small vibration wave linear motor comprising the self-running vibrator is comprised as the driving source of a lens frame for achieving a focus as described above, the lens implement that calmly makes lens driving can be provided.

Besides, in this case, the curving wiring parts of the flexible board of the vibration wave linear motor are arranged between the vibrator and the lens frame linked to the vibration wave linear motor and driven as described above, whereby the lens implement further reduced in size can be provided.

Still further, as shown in FIG. 12B, also a configuration where the wiring part 130-2 of the flexible board 130 is not branched, and only one wiring part 130-2 is arranged along the proceeding direction of the vibrator can contribute to a reduction in the size of the entire apparatus. The configuration where only one wiring part 130-2 of the flexible board 130 is arranged along the proceeding direction of the vibrator 70 as described above is effective for an arrangement configuration of two vibrators 70 as will be described later.

Namely, if only one wiring part 130-2 of the flexible board 130 is respectively arranged on the mutually opposite sides of the two vibrators, the wiring parts 130-2 of the flexible board 130 respectively for the two vibrators do not interfere with each other, thereby facilitating the assembly.

Second Preferred Embodiment

<Avoiding Interference Between the Movable Guide Member and the Vibrator Unit>

The guide member on the movable side 77-2 (hereinafter referred to as a movable guide member 77) oscillates response to moving of the vibrator 70, against the guide member on the fixed side 77-1. A large inclination sometimes occurs depending on a position relationship between the movable guide member 77 and the vibrator 70.

FIGS. 13A to 13D respectively show a position relationship between the vibrator 70 and the movable guide member 77, which is a premise in the second and succeeding preferred embodiments, and does not cause an inclination in the movable guide member 77.

Here, the pressing forces of the spiral springs 83 (also see FIGS. 4A and 4B), which press both ends of the movable guide member 77 upward from downward, are assumed to be equal, a middle position f between the spiral springs 83, which is shown in FIGS. 13A and 13D, is recognized as a position in which the pressing forces achieve a balance, and this position is referred to as a pressing force balanced position f.

If the pressing forces of the two spiral springs 83 are unequal, the above described pressing force balanced position f moves toward a spiral spring 83 having higher pressing force according to the principle of leverage. In this embodiment, the pressing forces of the two spiral springs 83 are adjusted in advance so that the pressing force balanced position f becomes as close to the middle position of the movable guide member as possible.

Generally, the position in which the pressing forces achieve a balance is a position in which the torque of the total pressing force achieves a balance, and the two guide members are held parallel when one point of the movable guide member is pressed to widen the spacing between the two guide members, and a predetermined pressing force is reached.

In other words, the pressing force balanced position f is also a point at which the movable guide member 77 is not rotated by the torque caused by the pressing forces of the spiral springs 83, and the movable guide member 77 keeps parallel to the guide member on the fixed side 77-1 when only one driving contacting part 76 touches in the pressing force balanced position f.

FIGS. 13A and 13B respectively show a case where the number of driving contacting parts 76 of the vibrator 70 is 4. In these cases, an inclination does not occur in the movable guide member 77 if driving contacting parts 76 exist on the left and the right sides of the pressing force balanced position f on both of the bottom and the top surfaces of the vibrator 70. This is similar also when the vibrator 70 is turned upside down.

FIGS. 13C and 13D respectively show a case where the number of driving contacting parts 76 of the vibrator 70 is 3. In these cases, an inclination does not occur in the movable guide member 77 only if one driving contacting part 76 exists in the pressing force balanced position f. This is similar also when the vibrator 70 is turned upside down.

Figure 14A:
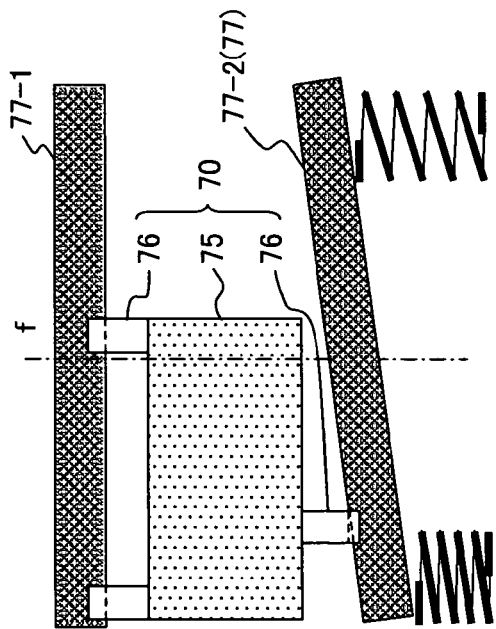
FIGS. 14A to 14D respectively show a position relationship between the vibrator and the movable guide member, which is a premise in the second and succeeding preferred embodiments and causes an inclination in the movable guide member.
Figure 14C:
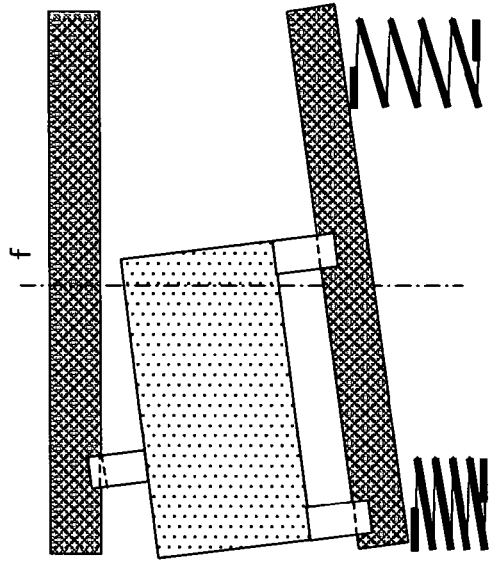
Figure 14B:
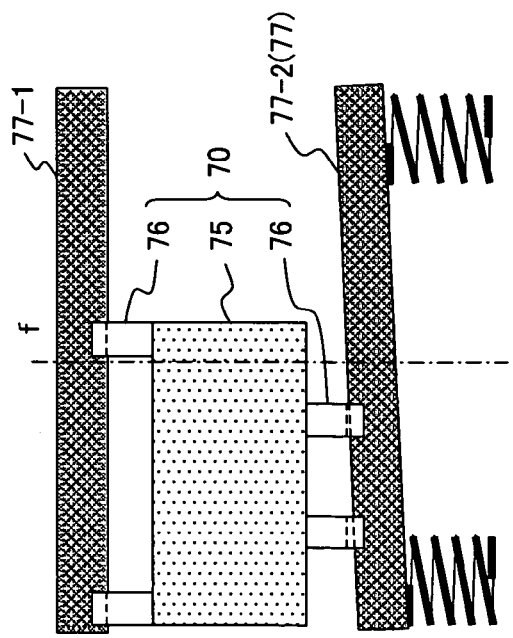

FIGS. 14A to 14D respectively show a position relationship between the vibrator 70 and the movable guide member 77, which is a premise in the second and succeeding preferred embodiments and causes an inclination in the movable guide member 77. FIGS. 14A and 14B respectively show a case where the number of driving contacting parts 76 of the vibrator 70 is 4. In these cases, an inclination occurs in the movable guide member 77 if all of driving contacting parts 76 on either of the top and the bottom surfaces move to one side of the pressing force balanced position f. This is similar also when the vibrator 70 is turned upside down.

Figure 14D:
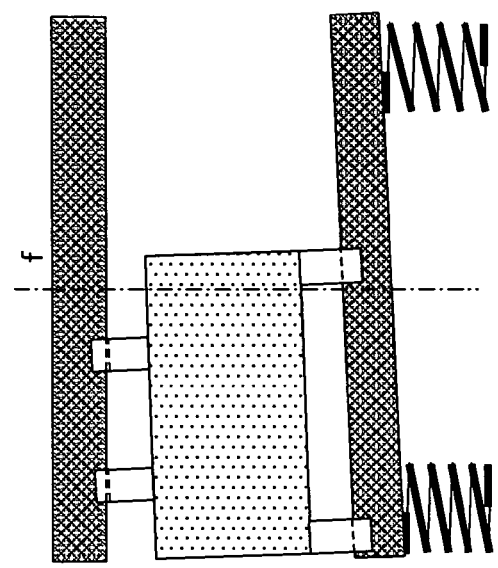

FIGS. 14C and 14D respectively show a case where the number of driving contacting parts of the vibrator 70 is 3. In these cases, if all of driving contacting parts 76 on either of the top and the bottom surfaces moves to one side of the pressing force balanced position f (only one driving contacting part 76 moves to one side of the pressing force balanced position f in FIGS. 14C and 14D), an inclination occurs in the movable guide member 77. This is similar also when the vibrator 70 is turned upside down.

Figure 15:
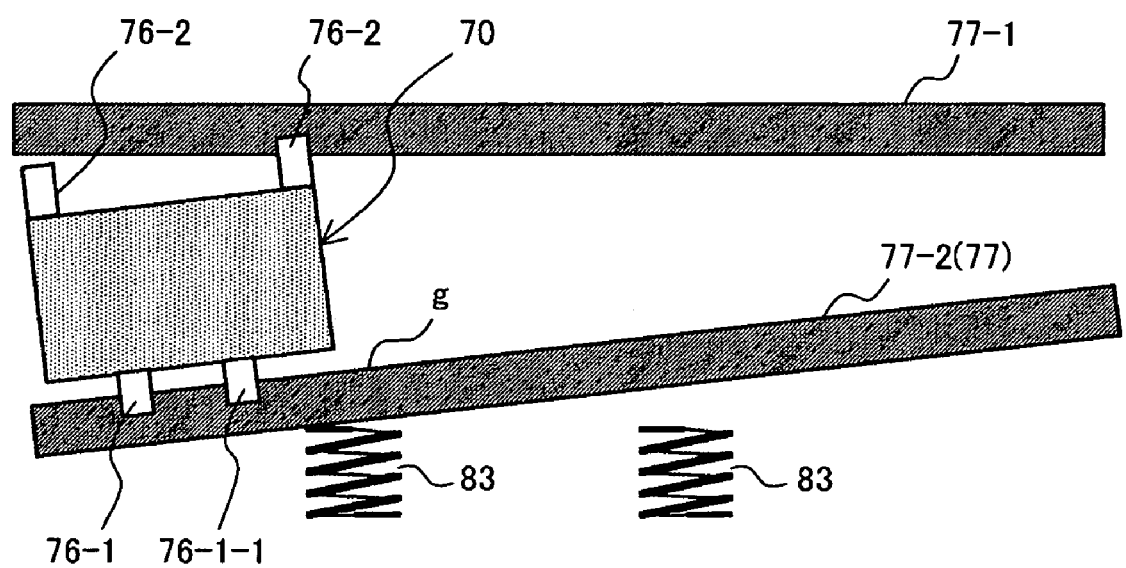
FIG. 15 shows an extremely different position relationship between the vibrator and the movable guide member, which is a premise in the second and succeeding preferred embodiments and causes an inclination in the movable guide member.

FIG. 15 shows an example of an extremely different position relationship between the vibrator 70 and the movable guide member 77, which is a premise in the second and succeeding preferred embodiments and causes an inclination in the movable guide member 77. This figure shows a state where the vibrator 70 moves outside the two spiral springs 83.

Here, assume that all of driving contacting parts 76 on either of the top and the bottom surfaces move to a position outside all of pressing force points (outside on the left side in FIG. 15) as shown in FIG. 15. Torque caused by the pressing force around a driving contacting part 76 (76-1-1), which is closest to a pressing force point on that surface, is only torque in a counterclockwise direction, if the spiral springs 83 are not adhered to the movable guide member 77. Accordingly, the movable guide member 77 does not become stable until it inclines as shown in FIG. 15, and the pressing forces of the spiral springs 83 substantially become 0.

In other words, the movable guide member 77 becomes stable in a position where torque in the clockwise direction, which is caused by the self-weight of the right portion of the movable guide member 77, and torque in the counterclockwise direction, which is caused by the self-weight of the left portion, the self-weight of the vibrator 70, and reaction force from the fixed guide member, achieve a balance by using the pressing force point g of the spiral spring 83 on the left side as a center.

In the state where the pressing force is applied to the vibrator 70, the guide member (77-1 or 77-2), which driving contacting parts 76-2 having a wider interval contact, is always followed. In this case, however, almost no pressing force is applied to the vibrator 70, and the movable guide member 77 falls down. Therefore, the guide member (the movable guide member 77 in the case shown in this figure) which driving contacting parts 76-1 (76-1, 76-1-1) having a narrow interval contact is followed. No driving force occurs in this state.

Accordingly, the move of the vibrator 70 must be restricted not to cause such a state where the driving force becomes 0. This can be implemented by regulating the move range of the vibrator 70 to make all of the driving contacting parts 76 of the vibrator 70 except for one driving contacting part always exist inside the pressing force points of the two spiral springs 83.

In the meantime, in addition to the need for restricting the move of the vibrator 70 in this way, the movable guide member 77 can possibly contact a portion other than the driving contacting parts 76 of the vibrator 76 due to an inclination because the movable guide member inclines as the vibrator moves as shown in FIG. 14A to 14D.

If the movable guide member 77 contacts the portion other than the driving contacting parts 76 of the vibrator 70, the portion other than the driving contacting parts 76 can possibly reduce the driving force as a resistance factor caused by the contact. This is because the portion does not generate an optimum elliptical vibration for the driving.

Besides, the material of the portion other than the driving contacting parts 76 is not optimized for contact. Namely, its degree of hardness is lower than that of the driving contacting parts 76. Therefore, the vibrator unit 75 itself can be possibly damaged, which shortens the lifetime of the vibration wave linear motor. Accordingly, the amount of move of the vibrator 70 must be restricted in order to avoid the movable guide member 76 from contacting the portion other than the driving contacting parts 76 of the vibrator 70 if an inclination occurs in the movable guide member.

FIG. 16A shows an example where the movable guide member 77 inclines as the vibrator 70 moves, and contacts a portion other than the driving contacting parts 76 of the vibrator 70 due to this inclination.

Here, assume that an angle formed by a horizontal line which passes through a point A at which the inclining movable guide member 77 and the driving contacting part 76 contact, and a line which similarly passes through the contact point A along the axis of the movable guide member 77 is E. Also assume that an angle of an inclination of the movable guide member 77 from the horizontal line is φ. In this case, this angle φ must be made smaller than the above described angle θ in order not to make the movable guide member 77 contact the portion other than the driving contacting parts 76 of the vibrator 70 when the movable guide member 77 inclines.

The horizontal line which passes through the contact point A is the same as a line whose reference is the guide member on the fixed side 77-1. The line which passes through the contact point A along the axis of the movable guide member 77 can also translate into a linear line which connects the contacting driving part 76 that the movable guide member 66 contacts (contact point A), and the other portion B of the vibrator 70.

Namely, the angle θ can translate into an angle formed by the guide member on the fixed side 77-1, and a linear line which connects the driving contacting part 76 that the movable guide member 77 contacts (contact point A) and the other portion B.

FIG. 16B shows an example where the movable guide member 77 and the vibrator 70 incline as the vibrator 70 moves when the vibrator 70 is set with a different arrangement, and the movable guide member 77 contacts a portion other than the driving contacting parts 76 of the vibrator 70 due to this inclination.

Here, assume that an angle formed by a horizontal line which passes through a point A at which the driving contacting part 76 and the guide member on the fixed side 77-1 contact, and a line which similarly passes through the contact point A along the axis of the movable guide member 77 is θ. Also assume that an angle of the inclination of the movable guide member 77 from the horizontal line is φ. In this case, this angle φ must be made smaller than the above described angle θ in order not to make the movable guide member 77 contact a portion other than the driving contacting parts 76 of the vibrator 70 when the movable guide member 77 inclines.

The horizontal line which passes through the contact point A can also translate into a linear line which connects the driving contacting part that the guide member on the fixed side 77-1 contacts (contact point A), and the other portion B on the vibrator 70.

Namely, the angle θ can translate into an angle formed by the movable guide member 77, and a linear line which connects the driving contacting part 76 that the guide member on the fixed side 77-1 contacts (contact point A), and the other portion B on the vibrator 70.

In FIGS. 16A and 16B, the angle θ is generally an angle formed by a linear line which connects a driving contacting part contacting a guide member and other portion on the vibrator 70, and the other guide member. This angle, which is larger than φ, is a condition to avoid a contact with a portion other than the driving contacting parts 76 of the vibrator 70 when the movable guide member 77 inclines.

FIG. 17A explains a relationship between the angle of the inclination of the movable guide member 77 and the states of respective parts, whereas FIG. 17B shows a graph of the angle of the inclination obtained from an equation of the relationship.

FIG. 17A shows a configuration where the spiral springs 83 are arranged at both ends of the movable guide member 77. If a driving contacting part 76-1-1 on the right side of driving contacting parts 76-1 having a narrow interval moves toward the left from a pressing force balanced position f in a middle portion, the movable guide member 77 inclines as shown in FIG. 17A, and stops in a position where torque achieves a balance as described above.

Here, d1, d2, and the pressing force are calculated by assuming that the length of both of the upper and lower guide members is 2l, the angle of the inclination of the movable guide member 77 in the above described balanced position is φ, a distance from the pressing force balanced position f to the contact point A is Z, a distance between the horizontal line 131 which passes through the contact point A and the top of the round surface at the right end of the movable guide member 77 is d1, a distance between the horizontal line 131 which passes through the contact point A and the top of the round surface at the left end of the movable guide member 77 is d2, a constant of a spiral spring 83 is k, and a distance from the horizontal line 132 along the top of the round surface of the movable guide member 77 in an initial position of the upper end portion (pressing part) of a spiral spring 83 when the vibrator 70 is out to the horizontal line 131 which passes through the contact point A is x0.

An equation of the torque balance where the spiral springs 83 are at both ends of the movable guide member 77 is represented as follows.

$$k(x_0+d_2)(l-z)=k(x_0-d_1)(l+z)$$

This calculation assumes a case where the spiral springs 83 are adhered to the movable guide member 77, and accordingly, forces exert both in positive and negative directions. Since the movable guide member 77 rotates about the driving contacting part 76-1-1 on the right side as a pivot, d1 and d2 have the following relationship.

$$d_1/d_2=(l-z)/(l+z)$$

If the above provided equation (1) is transformed, the following equation is obtained.

$$(x_0 - d_1) = (x_0 + d_2)(l-z)/(l+z)$$
$$\therefore -d_1 = x_0(l-z)/(l+z) - x_0 + d_2(l-z)/(l+z)$$
$$= -2zx_0/(l+z) + d_2(l-z)/(l+z)$$

With the equation (2), the following equation is further obtained.

$$= -2zx_0/(l+z) + d_1\{(l-z)/(l+z)\}^2$$
$$-2zx_0/(l+z) = d_1\{(l-z)^2 + (l+z)^2\}/(l+z)^2$$
$$\therefore d_1 = (l+z)zx_0/(l^2+z^2),$$
$$d_2 = (l-z)zx_0/(l^2+z^2)$$

Namely, the angle φ of the inclination of the movable guide member 77 becomes as follows.

$$\tan \phi = (d_1+d_2)/2l = zx_0/(l^2+z^2)$$

The graph of the angle of the inclination, which is shown in FIG. 17B, is represented from the above provided equation. This graph is a calculation result when x0=0.1l. Since the maximum value of the angle of the inclination is 2.9° as indicated by this graph, a design may be made to achieve θ>2.9° in FIG. 17A. If the design is made in this way, the inclining movable guide member 77 does not contact a portion other than the driving contacting parts 76 of the vibrator 70 in whichever position the vibrator 70 exists.

In this example, θ can be made large by making a driving contacting part 76 sufficiently protrude from the vibrator unit 75, whereby the desired θ>2.9° can be achieved.

If the vibrator 70 shown in this figure is upside down inversely to FIG. 17A, the vibrator 70 inclines according to the movable guide member 77. Also in this case, the condition of θ, under which the guide member on the fixed side 77-1 does not contact a portion other than the driving contacting parts 76 of the vibrator 70, can be obtained in exactly the same way.

Third Preferred Embodiment

<Regulation of the Move Range of the Vibrator (No. 1)>

With the regulation (restriction) of the angle of the inclination of the movable guide member 77, the angle of the inclination of the movable guide member 77 can be always made 0 if the move range of the vibrator 70 is within the range of the condition, under which the movable guide member 77 does not incline as described with reference to FIGS. 13A to 13D, without allowing an inclination up to a certain range as described above. As a result, the movable guide member 77 can be securely prevented from contacting a portion other than the driving contacting parts 76 of the vibrator 70 even when an unexpected vibration or impact is externally applied.

Figure 18:
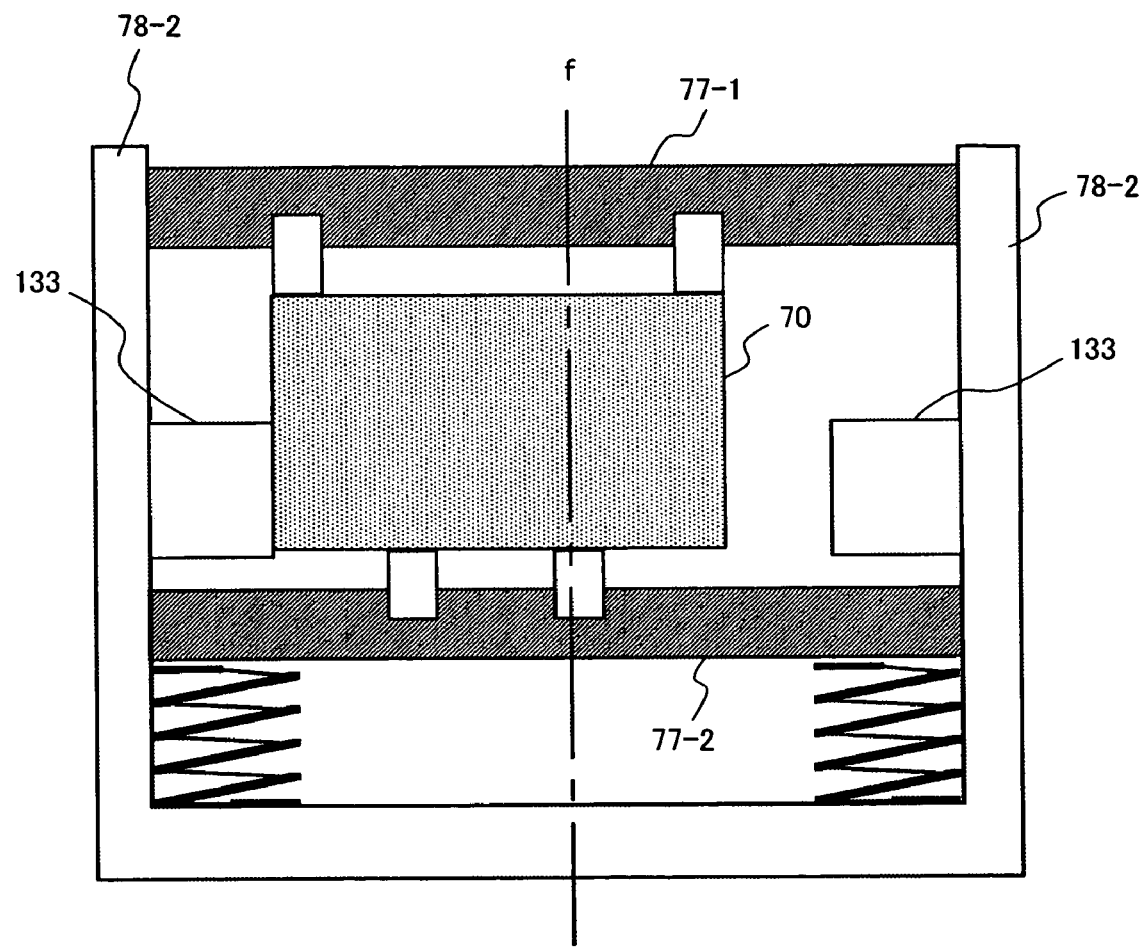
FIG. 18 shows a configuration for regulating the move of the vibrator so that the vibrator does not move outside a range of a condition under which the movable guide member does not incline, as a third preferred embodiment.

FIG. 18 shows a configuration where the move of the vibrator 70 is regulated in order not to make the vibrator 70 moves outside the range of the condition under which the movable guide member 77 does not incline as described with reference to FIGS. 13A to 13D and 14A to 14D, as the third preferred embodiment.

As shown in FIG. 18, in this vibration wave linear motor, stoppers 133 are respectively fixed to the inner sides of the erecting parts 78-2 of the supporting part 78 which supports the two guide members 77-1 and 77-2, and are arranged to protrude in the horizontal direction. In the example shown in FIG. 18, the vibrator 70 moves to the left, and contacts the stopper 133 provided in the inner side of the erecting part 78-2 on the left side to restrict the vibrator 70 not to make a further move. The vibrator 70 is stopped at the limitation point of the range of the condition under which the movable guide member 77 does not incline as described with reference to FIGS. 13A to 13D.

Providing the stoppers on both sides of the move direction of the vibrator 70 as described above is effective not only to keep the inclination of the movable guide member 77 to be "0" as described above, but also to regulate the vibrator 70 to move within the above described range of θ>φ also when the inclination of the movable guide member 77 is allowed in that range.

Additionally, the stoppers 133 are provided as a shape fixed to the supporting part 78 which supports the two guide members as described above. This contributes to the down-sizing of the vibration wave linear motor.

Instead of directly restricting the move of the vibrator 70 with the stoppers in this way, the position of the vibrator 70 may be controlled so that the vibrator 70 moves within the range of the condition, under which the movable shaft (guide member) does not incline, by using a position detecting sensor which detects the absolute position of the vibrator 70.

For example, the absolute position of the vibrator 70 is indirectly detected with the photosensor 73 which detects the absolute position of the third movable lens frame 19 by detecting the light reflected from the light reflecting member 62, which is installed in the third movable lens frame 19 moving along with the vibrator 70, and the position of the vibrator 70 may be controlled with the control circuit mounted on the circuit board 2 based on this information so that the vibrator 70 moves within the range of the condition under which the movable guide member 77 does not incline.

Fourth Preferred Embodiment

<Regulation of the Move Range of the Vibrator (No. 2)>

If the inclination of the movable guide member 77 is allowed in the above described range of θ>φ, the configuration of the supporting part 78 which supports the two guide members becomes large by a space where the stoppers are provided when they are provided to restrict the move of the vibrator 70 to within that range.

Figures 19A, 19B:
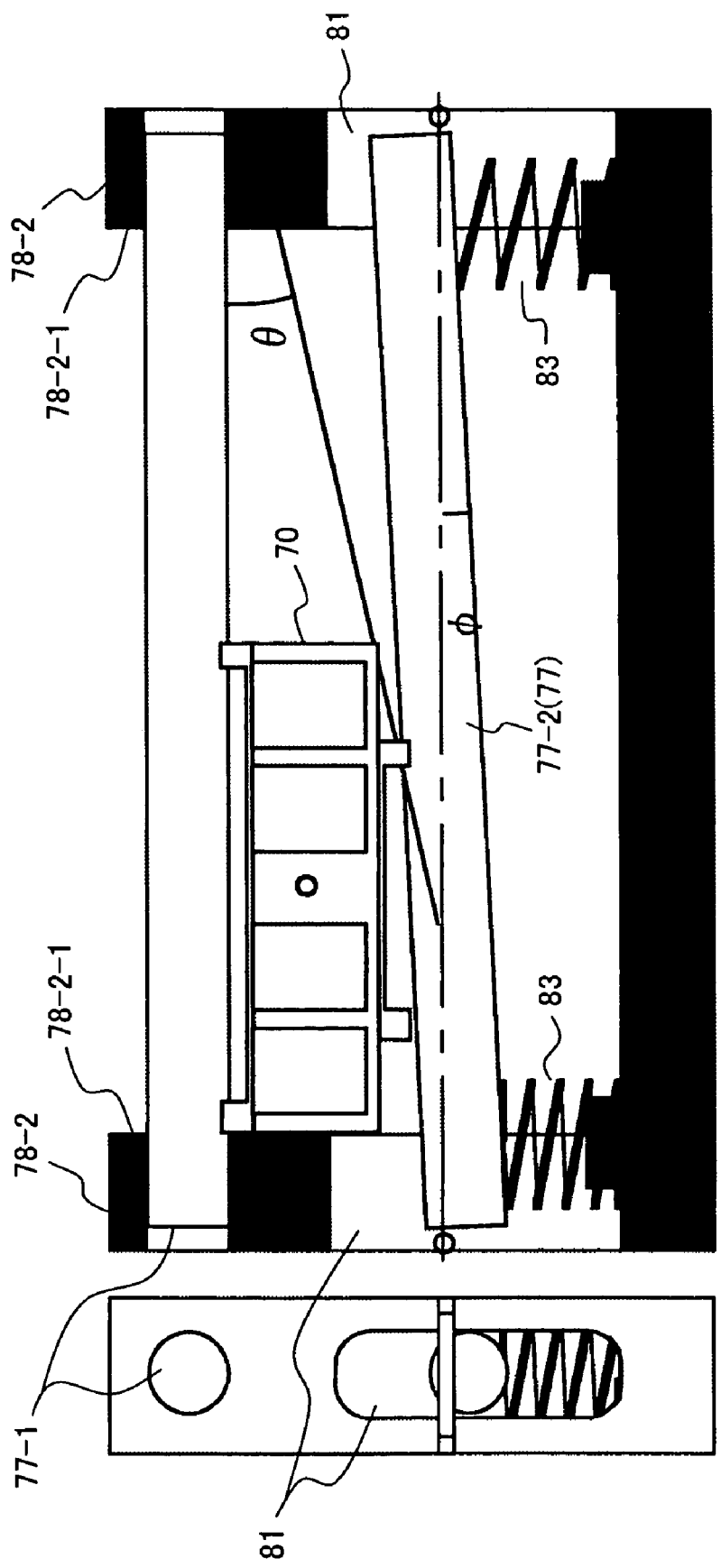
FIG. 19A is a front view of a cross section of a small-sized vibration wave linear motor, which regulates the move of the vibrator in order to keep the inclination of the movable guide member within a range of $\theta > \phi$ as a fourth preferred embodiment.
FIG. 19B is its side view.

FIG. 19A is a front view of a cross section of a small-sized configuration of the vibration wave linear motor, which regulates the move of the vibrator 70, in order to keep the inclination of the movable guide member 77 within the range of θ>φ, as the fourth preferred embodiment, whereas FIG. 19B is its side view.

As shown in FIGS. 19A and 19B, both ends of the movable guide member 77 are held by the shaft bearing long holes 81 to freely oscillate, and the inclination having the angle φ occurs according to the move of the vibrator 70. However, an inner wall 78-2-1 of an erecting part 78-2 of the supporting part 78 also serves as a stopper, and the inner wall 78-2-1 regulates the move of the vibrator 70 in a position where the inclination of the movable guide member 77 is θ>φ at the maximum.

Fifth Preferred Embodiment

<Regulation of the Inclination of the Movable Shaft (Guide Member) (No. 1)>

The above described second to fourth preferred embodiments only refer to the configurations where the move range of the vibrator is regulated to avoid interference (contact) between the movable shaft (guide member) and the vibrator unit. However, an inclination itself caused by the move of the movable shaft may be regulated.

Also in that case, as shown in FIG. 15, it is necessary to regulate the move of the vibrator 70 with a stopper, an inner wall of an erecting part of the supporting part, a position control, etc. in order to prevent driving contacting parts 76 of one of the top and the bottom surfaces of the vibrator 70 from moving outside all of pressing parts, or to prevent the vibrator 70 from moving beyond the range of the length of the two upper and lower shafts (guide members), as a matter of course.

Figures 20A, 20B:
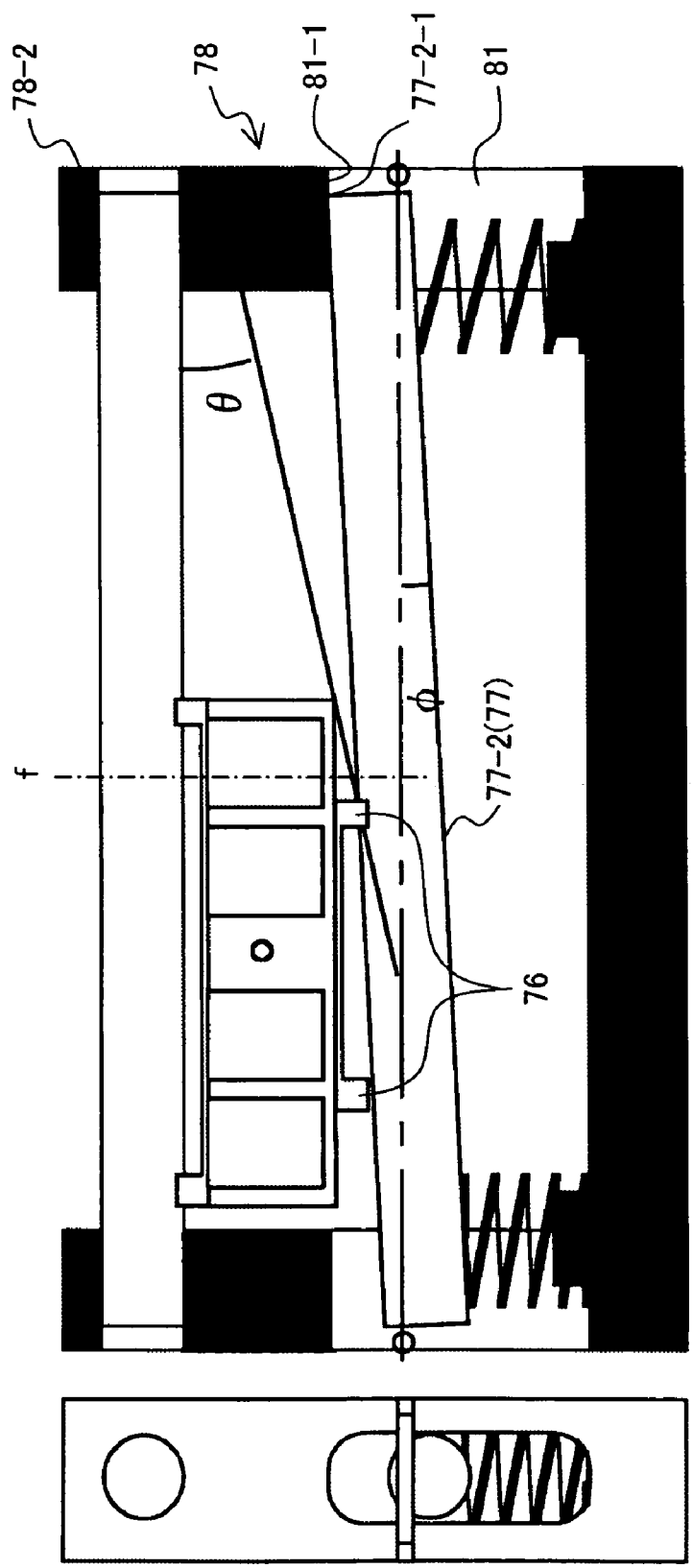
FIG. 20A is a front view of a cross section of a small-sized vibration wave linear motor, which regulates the inclination of the movable guide member in order to keep the inclination of the movable guide member to be within the range of $\theta > \phi$, as a fifth preferred embodiment.
FIG. 20B is its side view.

FIG. 20A is a front view of a cross section of a small-sized vibration wave linear motor, which regulates the inclination of the movable shaft to keep the inclination of the movable shaft to be within the range of θ>φ, as the fifth preferred embodiment, whereas FIG. 20B is its side view.

As shown in FIG. 20A, all of driving contacting parts 76 (driving contacting parts 76 on the bottom surface in FIG. 20A) on one of the top and the bottom surfaces move to one side of the pressing force balanced position f, and the movable guide member 77 inclines by rotating in the counterclockwise direction in a similar manner as in the case shown in FIG. 14A. A top 77-2-1 of the round surface at the end of the movable guide member 77 contacts an upper inner surface 81-1 of a shaft bearing long hole 81 of an erecting part 78-2 of the supporting part 78 in order to prevent the movable guide member 77 from further inclining.

Also by using the upper inner surface 81-1 of the shaft bearing long hole 81 as a stopper for the inclination of the movable guide member 77 as described above, the inclination of the movable guide member 77 can be kept within the range of θ>φ regardless of the position of the vibrator 70.

Sixth Preferred Embodiment

<Regulation of the Inclination of the Movable Shaft (Guide Member) (No. 2)>

Figures 21A, 21B:
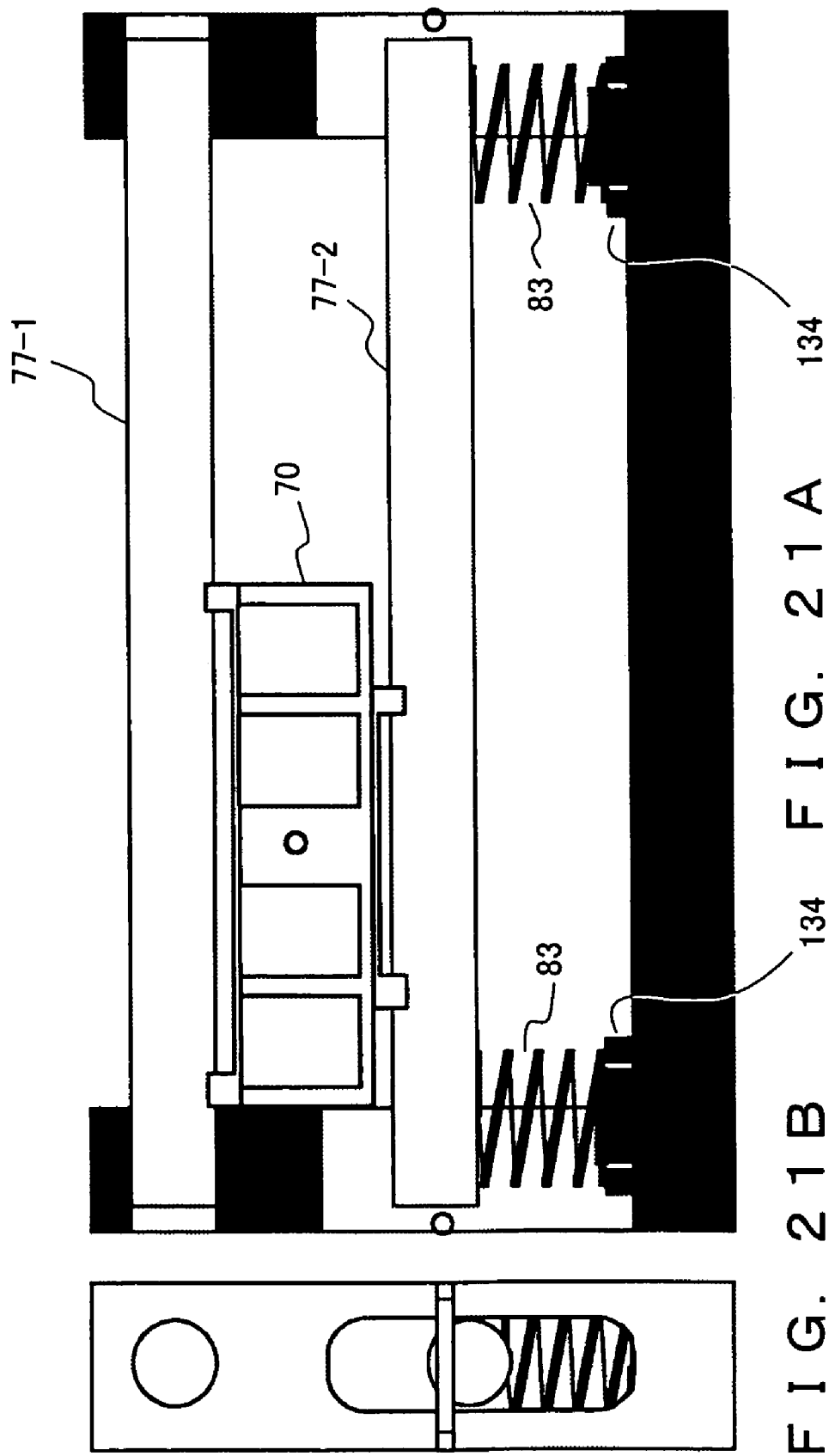
FIG. 21A is a front view of a cross section of a small-sized vibration wave linear motor, which regulates the inclination of the movable guide member in order to always keep the inclination of the movable guide member to be 0, as a sixth preferred embodiment.
FIG. 21B is its side view.

FIG. 21A is a front view of a cross section of a small-sized vibration wave linear motor, which regulates the inclination of the movable shaft to keep the inclination of the movable shaft to be always "0", as the sixth preferred embodiment, whereas FIG. 21B is its side view.

In the vibration wave linear motor shown in FIGS. 21A and 21B, the bottoms of the spiral springs 83 are held not within the hollow portions of the convex parts 82, which are provided at the outer bottom of the base part 78-1 of the supporting part 78, as shown in FIGS. 4A and 4B, but in the top portions of cylindrical actuators 134, which are provided in positions similar to those of the convex parts 82 shown in FIGS. 4A and 4B, as shown in FIG. 21A.

The cylindrical actuators 134 are driven to rise and fall by a control from the control circuit. When the cylindrical actuators 134 rise, they press the spiral springs 83 from downward to strengthen the pressing forces of the spiral springs 83. Or, when the cylindrical actuators 134 fall, they press the spiral springs 83 from downward to weaken the pressing forces of the spiral springs 83.

If it is detected with the above described absolute position sensor and a driving voltage pulse that the vibrator 70 moves to one side (the left side in the example shown in FIG. 21) as shown in FIG. 21A, the control circuit always corrects the imbalance of torques applied to the movable guide member 77 by making a cylindrical actuator 134 provided in a spiral spring 83, which the vibrator 70 approaches, rise to strengthen the pressing force of the spiral spring 83. As a result, the balanced position of the torques is moved as the vibrator 70 moves, and the movable guide member 77 is always kept parallel to the guide member on the fixed side 77-1.

The movable guide member 77 is always kept parallel to the guide member on the fixed side 77-1 as described above, whereby the 4 driving contacting parts 76 of the vibrator 70 can be made to always contact the two guide members 77. As a result, efficient driving force of the vibrator 70, which is caused by the 4 driving contacting parts, can be taken out.

As described above, according to the present invention, the respective parts are designed to achieve θ>φ if it is assumed that the inclination of the movable guide member of the two guide members of the vibration wave linear motor is φ, and the angle at which the inclining movable guide member contacts a portion other than the driving contacting parts of the vibrator is θ, or the move amount of the vibrator is restricted, or the inclination of the movable guide member is restricted, whereby a contact between the guide member and the vibrator in an unnecessary portion can be prevented. As a result, the reliability of the driving force of the vibration wave linear motor is improved, and at the same time, its lifetime can be extended as long as possible. As described above, the vibration wave linear motor according to the present invention, which has a small configuration where a particular rotation stopper for stopping the rotation of a vibrator is unnecessary, prevents a danger such that a guide member on a movable side contacts a portion other than driving contacting parts due to an inclination of the guide member on the movable side, which occurs as the vibrator moves.

What is claimed is:

1. A vibration wave linear motor, comprising:
   a vibrator having a vibrator unit configured to comprise a piezoelectric unit, and driving contacting parts respectively provided on two opposed surfaces of the vibrator unit;
   first and second guide members sandwiching the vibrator via the driving contacting parts;
   a pressing part relatively pressing the second guide member toward the first guide member, and generating pressing force from the second guide member toward the first guide member; and
   a holding part fixing and holding the first guide member, and holding the second guide member to be movable in a direction of the pressing force, wherein
   the driving contacting parts convert a vibration generated by applying a voltage to the vibrator unit into driving force, whereby the vibrator and the two guide members make a relative move, and
   an inclination $\phi$, which occurs between the first guide member and the second guide member as the vibrator moves, is configured to be smaller than an inclination $\theta$, which is formed by a linear line connecting a driving contacting part that one of the first and the second guide members contacts and other portion on the vibrator, and the other guide member as opposed to the one guide member.

2. The vibration wave linear motor according to claim 1, wherein
   the vibrator respectively comprises at least two driving contacting parts on the two opposed surfaces.

3. The vibration wave linear motor according to claim 1, wherein
   the vibrator comprises at least one driving contacting part on one of the two opposed surfaces, and at least two driving contacting parts on the other surface.

4. The vibration wave linear motor according to claim 1, further comprising
   a first restricting part restricting a move range of the vibrator in a direction of the relative move with reference to the guide member of the vibrator.

5. The vibration wave linear motor according to claim 4, wherein
   the first restricting part is fixed to the holding part or the first or the second guide member.

6. The vibration wave linear motor according to claim 4, wherein
   a portion of the holding part or a first or a second regulating unit also serves as the first restricting part.

7. The vibration wave linear motor according to claim 4, wherein
   the first restricting part restricts the move range of the vibrator so that the inclination $\phi$ is within a range smaller than the inclination $\theta$.

8. The vibration wave linear motor according to claim 4, wherein
   the pressing part applies the pressing force to two points of the second guide member, and the first restricting part restricts the move range of the vibrator so that the driving contacting parts do not move outside the two points in the direction of the relative move of the vibrator.

9. The vibration wave linear motor according to claim 4, wherein
   the vibrator respectively comprises at least two driving contacting parts on the two opposed surfaces, the pressing part applies the pressing force to two points of the second guide member, and the first restricting part restricts the move of the vibrator in the direction of the relative move of the vibrator so that a balanced position of the pressing force which is applied to the two points, is sandwiched by the driving contacting parts.

10. The vibration wave linear motor according to claim 1, further comprising
    a second restricting part restricting the move of the second regulating unit in a pressing direction.

11. The vibration wave linear motor according to claim 10, wherein
    the second restricting part is fixed to the holding part.

12. The vibration wave linear motor according to claim 10, wherein
    a portion of the holding unit also serves as the second restricting part.

13. The vibration wave linear motor according to claim 10, wherein
    the second restricting part restricts the move of the second guide member within the range where the inclination $\phi$ is smaller than the inclination $\theta$.

14. The vibration wave linear motor according to claim 1, further comprising
    a controlling unit detecting the inclination $\phi$, which occurs between the first guide member and the second guide member as the vibrator moves, or a parameter with which the inclination $\phi$ can be calculated, and controlling the pressing part to make the inclination $\phi$ smaller than the inclination $\theta$.

15. A vibration wave linear motor, comprising:
    a vibrator having a vibrator unit configured to comprise a piezoelectric unit, and driving contacting parts respectively provided on two opposed surfaces of the vibrator unit;
    first and second guide members sandwiching the vibrator via the driving contacting parts; and
    a pressing part relatively pressing the second guide member toward the first guide member, and generating pressing force from the second guide member toward the first guide member; and
    a holding part fixing and holding the first guide member, and holding the second guide member to be movable in a direction of the pressing force, wherein
    the driving contacting parts convert a vibration generated by applying a voltage to the vibrator unit into driving force, whereby the vibrator and the two guide members make a relative move, and
    a guide member displacement restricting part restricting a displacement of the second guide member with reference to the first guide member, which occurs as the vibrator makes the relative move, to a predetermined range is further comprised.

16. The vibration wave linear motor according to claim 15, wherein
    the guide member displacement restricting part restricts the displacement of the second guide member by restricting the range of the relative move of the vibrator to the predetermined range.

17. The vibration wave linear motor according to claim 16, wherein
    the guide member displacement restricting part restricts the displacement of the second guide member by controlling the range of the relative move of the vibrator to be the predetermined range.

18. The vibration wave linear motor according to claim 15, wherein
the guide member displacement restricting part comprises a portion restricting the displacement of the guide member.

19. A vibration wave linear motor, comprising:
a vibrator having a vibrator unit configured to comprise a piezoelectric unit, and driving contacting parts respectively provided on two opposed surfaces of the vibrator unit;
first and second guide members sandwiching the vibrator via the driving contacting parts;
a pressing part relatively pressing the second guide member toward the first guide member, and generating pressing force from the second guide member toward the first guide member; and
a holding part fixing and holding the first guide member, and holding the second guide member to be movable in a direction of the pressing force, wherein
the driving contacting parts convert a vibration generated by applying a voltage to the vibrator unit into driving force, whereby the vibrator and the two guide members make a relative move, and
an angle of an inclination $\theta$, which is formed by a linear line connecting a driving contacting part that one of the first and the second guide members contacts, and other portion on the vibrator, and the other guide member as opposed to the one guide member, is larger than an angle of a predetermined inclination.

20. The vibration wave linear motor according to claim 19, wherein
the angle of the predetermined inclination is a maximum value determined by a length of the first or the second guide member, a constant of a spring comprised by the pressing part, a distance between an initial position of the pressing part and a line which passes through a point at which the second guide member and a driving contacting part contact and is parallel to the first guide member, distances between a line which passes through the point at which the second guide member and the driving contacting part contact and is parallel to the first guide member, and tops of round surfaces at both ends of the second guide member, and a distance from a pressing force balanced position of the second guide member to the contact point with the driving contacting part.

21. The vibration wave linear motor according to claim 20, wherein
the maximum value is a maximum value of an angle $\phi$ obtained by an equation $$\tan \phi = (d_1 + d_2)/2l = zx_0/(l^2 + z^2)$$

by assuming that the length of the first or the second guide member is $2l$, the constant of the spring comprised by the pressing part is k, the distance between the initial position of the pressing part and the line which passes through the point at which the second guide member and the driving contacting part contact and is parallel to the first guide member is $x_0$, the distances between the line which passes through the point at which the second guide member and the driving contacting part contact and is parallel to the first guide member, and the tops of the round surfaces at both ends of the second guide member are $d_1$ and $d_2$, and the distance from the pressing force balanced position of the second guide member to the contact point with the driving contacting part is z.

* * * * *